United States Patent
Michaels

(10) Patent No.: US 8,165,065 B2
(45) Date of Patent: Apr. 24, 2012

(54) AD-HOC NETWORK ACQUISITION USING CHAOTIC SEQUENCE SPREAD WAVEFORM

(75) Inventor: Alan J. Michaels, West Melbourne, FL (US)

(73) Assignee: Harris Corporation, Melbourne, FL (US)

(*) Notice: Subject to any disclaimer, the term of this patent is extended or adjusted under 35 U.S.C. 154(b) by 629 days.

(21) Appl. No.: 12/248,131

(22) Filed: Oct. 9, 2008

(65) Prior Publication Data
US 2010/0091700 A1    Apr. 15, 2010

(51) Int. Cl.
*H04W 4/00* (2009.01)
*H04B 7/216* (2006.01)

(52) U.S. Cl. ...... 370/328; 370/335; 370/342; 455/435.1

(58) Field of Classification Search .................... 370/328
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 5,007,087 A | 4/1991 | Bernstein et al. |
| 5,048,086 A | 9/1991 | Bianco et al. |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,598,476 A | 1/1997 | LaBarre et al. |
| 5,646,997 A | 7/1997 | Barton |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,924,980 A | 7/1999 | Coetzee |
| 5,937,000 A | 8/1999 | Lee et al. |
| 6,014,446 A | 1/2000 | Finkelstein |

(Continued)

FOREIGN PATENT DOCUMENTS

EP      0 849 664 A2      6/1998

(Continued)

OTHER PUBLICATIONS

Barda, A.; Laufer, S.;, "Chaotic signals for multiple access communications," Electrical and Electronics Engineers in Israel, 1995., Eighteenth Convention of, vol., no., pp. 2.1.3/1-2.1.3/5, Mar. 7-8, 1995.*

(Continued)

*Primary Examiner* — Jeffrey Pwu
*Assistant Examiner* — Kodzovi Acolatse
(74) *Attorney, Agent, or Firm* — Fox Rothschild, LLP; Robert J. Sacco

(57) ABSTRACT

Method and system for identifying neighbor nodes in an ad-hoc wireless network including two or more nodes. The method involves generating a beacon signal at a first node of the network for alerting other nodes in the network of the presence of the first node. A digitally generated first spreading sequence is also generated at the first node. Thereafter, the beacon signal is modulated with the first spreading sequence to produce a spread spectrum signal which is then transmitted. The spreading sequence is selected to be a chaotic sequence.

27 Claims, 9 Drawing Sheets

U.S. PATENT DOCUMENTS

| | | | |
|---|---|---|---|
| 6,023,612 A | 2/2000 | Harris et al. | |
| 6,038,317 A | 3/2000 | Magliveras et al. | |
| 6,078,611 A | 6/2000 | La Rosa et al. | |
| 6,141,786 A | 10/2000 | Cox et al. | |
| 6,304,216 B1 | 10/2001 | Gronemeyer | |
| 6,304,556 B1 * | 10/2001 | Haas | 370/254 |
| 6,314,187 B1 | 11/2001 | Menkhoff et al. | |
| 6,331,974 B1 | 12/2001 | Yang et al. | |
| 6,377,782 B1 | 4/2002 | Bishop et al. | |
| 6,570,909 B1 | 5/2003 | Kansakoski et al. | |
| 6,614,914 B1 | 9/2003 | Rhoads et al. | |
| 6,665,692 B1 | 12/2003 | Nieminen | |
| 6,732,127 B2 | 5/2004 | Karp | |
| 6,744,893 B1 | 6/2004 | Fleming-Dahl | |
| 6,754,251 B1 | 6/2004 | Sriram et al. | |
| 6,766,345 B2 | 7/2004 | Stein et al. | |
| 6,842,479 B2 | 1/2005 | Bottomley | |
| 6,980,656 B1 | 12/2005 | Hinton, Sr. et al. | |
| 6,986,054 B2 | 1/2006 | Kaminaga et al. | |
| 6,993,016 B1 | 1/2006 | Liva et al. | |
| 7,023,323 B1 | 4/2006 | Nysen | |
| 7,027,598 B1 | 4/2006 | Stojancic et al. | |
| 7,069,492 B2 | 6/2006 | Piret et al. | |
| 7,076,065 B2 | 7/2006 | Sherman et al. | |
| 7,078,981 B2 | 7/2006 | Farag | |
| 7,079,651 B2 | 7/2006 | Den Boer et al. | |
| 7,095,778 B2 | 8/2006 | Okubo et al. | |
| 7,133,522 B2 | 11/2006 | Lambert | |
| 7,170,997 B2 | 1/2007 | Petersen et al. | |
| 7,190,681 B1 | 3/2007 | Wu | |
| 7,200,225 B1 | 4/2007 | Schroeppel | |
| 7,233,969 B2 | 6/2007 | Rawlins et al. | |
| 7,233,970 B2 | 6/2007 | North et al. | |
| 7,245,723 B2 | 7/2007 | Hinton, Sr. et al. | |
| 7,269,198 B1 * | 9/2007 | Elliott et al. | 375/130 |
| 7,269,258 B2 | 9/2007 | Ishihara et al. | |
| 7,272,168 B2 | 9/2007 | Akopian | |
| 7,277,540 B1 | 10/2007 | Shiba et al. | |
| 7,529,292 B2 | 5/2009 | Bultan et al. | |
| 7,643,537 B1 | 1/2010 | Giallorenzi et al. | |
| 7,779,060 B2 | 8/2010 | Kocarev et al. | |
| 7,830,214 B2 | 11/2010 | Han et al. | |
| 7,853,014 B2 | 12/2010 | Blakley et al. | |
| 7,921,145 B2 | 4/2011 | Michaels | |
| 7,937,427 B2 | 5/2011 | Chester et al. | |
| 7,962,540 B2 | 6/2011 | Michaels et al. | |
| 7,970,809 B2 | 6/2011 | Michaels et al. | |
| 7,974,146 B2 | 7/2011 | Barkley | |
| 7,974,413 B2 | 7/2011 | Chester et al. | |
| 7,995,749 B2 | 8/2011 | Michaels | |
| 7,995,757 B2 | 8/2011 | Michaels et al. | |
| 2002/0012403 A1 | 1/2002 | McGowan et al. | |
| 2002/0034191 A1 | 3/2002 | Shattil | |
| 2002/0099746 A1 | 7/2002 | Tie et al. | |
| 2002/0174152 A1 | 11/2002 | Terasawa et al. | |
| 2002/0186750 A1 | 12/2002 | Callaway et al. | |
| 2003/0016691 A1 | 1/2003 | Cho | |
| 2003/0044004 A1 | 3/2003 | Blakley et al. | |
| 2004/0001556 A1 | 1/2004 | Harrison et al. | |
| 2004/0059767 A1 | 3/2004 | Liardet | |
| 2004/0092291 A1 | 5/2004 | Legnain et al. | |
| 2004/0146095 A1 | 7/2004 | Umeno et al. | |
| 2004/0156427 A1 | 8/2004 | Gilhousen et al. | |
| 2004/0196212 A1 | 10/2004 | Shimizu | |
| 2005/0031120 A1 | 2/2005 | Samid | |
| 2005/0050121 A1 | 3/2005 | Klein et al. | |
| 2005/0089169 A1 | 4/2005 | Kim et al. | |
| 2005/0207574 A1 | 9/2005 | Pitz et al. | |
| 2005/0259723 A1 | 11/2005 | Blanchard | |
| 2005/0274807 A1 | 12/2005 | Barrus et al. | |
| 2006/0072754 A1 | 4/2006 | Hinton et al. | |
| 2006/0093136 A1 | 5/2006 | Zhang et al. | |
| 2006/0123325 A1 | 6/2006 | Wilson et al. | |
| 2006/0209926 A1 | 9/2006 | Umeno et al. | |
| 2006/0209932 A1 | 9/2006 | Khandekar et al. | |
| 2006/0251250 A1 | 11/2006 | Ruggiero et al. | |
| 2007/0121945 A1 | 5/2007 | Han et al. | |
| 2007/0230701 A1 | 10/2007 | Park et al. | |
| 2008/0008320 A1 | 1/2008 | Hinton et al. | |
| 2008/0016431 A1 | 1/2008 | Lablans | |
| 2008/0095215 A1 | 4/2008 | McDermott et al. | |
| 2008/0198832 A1 | 8/2008 | Chester | |
| 2008/0263119 A1 | 10/2008 | Chester et al. | |
| 2008/0294707 A1 | 11/2008 | Suzuki et al. | |
| 2008/0294710 A1 | 11/2008 | Michaels | |
| 2008/0294956 A1 | 11/2008 | Chester et al. | |
| 2008/0304553 A1 | 12/2008 | Zhao et al. | |
| 2008/0304666 A1 | 12/2008 | Chester et al. | |
| 2008/0307022 A1 | 12/2008 | Michaels et al. | |
| 2008/0307024 A1 | 12/2008 | Michaels et al. | |
| 2009/0034727 A1 | 2/2009 | Chester et al. | |
| 2009/0044080 A1 | 2/2009 | Michaels et al. | |
| 2009/0059882 A1 | 3/2009 | Hwang et al. | |
| 2009/0110197 A1 | 4/2009 | Michaels | |
| 2009/0122926 A1 | 5/2009 | Azenkot et al. | |
| 2009/0196420 A1 | 8/2009 | Chester et al. | |
| 2009/0202067 A1 | 8/2009 | Michaels et al. | |
| 2009/0245327 A1 | 10/2009 | Michaels | |
| 2009/0279688 A1 | 11/2009 | Michaels et al. | |
| 2009/0279690 A1 | 11/2009 | Michaels et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0316679 A1 | 12/2009 | Van Der Wateren | |
| 2009/0323766 A1 | 12/2009 | Wang et al. | |
| 2009/0327387 A1 | 12/2009 | Michaels et al. | |
| 2010/0054225 A1 | 3/2010 | Hadef et al. | |
| 2010/0111296 A1 | 5/2010 | Brown et al. | |
| 2010/0254430 A1 | 10/2010 | Lee et al. | |

FOREIGN PATENT DOCUMENTS

| | | |
|---|---|---|
| EP | 0 949 563 | 10/1999 |
| EP | 2 000 900 A2 | 12/2008 |
| EP | 2 000 902 A2 | 12/2008 |
| GB | 1167272 A | 10/1969 |
| JP | 2004279784 A | 10/2004 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Boyar Joan, "Inferring sequences produced by pseudo-random number generators", Journal ACM, vol. 36, Issue. 1, Jan. 1989.*

Guiseppe Alia, Enrico Martinelli, "A VLSI Algorithm for Direct and Reverse Conversion from Weighted Binary Number System to Residue Number System", IEEE Trans on Circuits and Systems, vol. Cas-31, No. 12, Dec. 1984.*

Abel, et al., "Chaos Communications—Principles, Schemes, and System Analysis" Proceedings for the IEEE, IEEE. New York, NY. vol. 90, No. 5, May 1, 2002, XP011064997, ISSN: 0018-9219.

Barile, Margherita, "Bijective," From MathWorld—A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m−1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource. http://mathworld.wolfram.com/Surjection.html.

Yen, et al., (1999) "Residual Number Sysetm Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquistion Using Chaotic Sequence Spread Waveform".

Michaels, Alan, U.S. Appl. No. 12/201,021, filed Aug. 29, 2008, entitled, "Multi-Tier Ad-Hoc Network Communications".

Aparicio; "Communications Systems Based on Chaos" May 2007. Universidad Rey Juan Carlos.

Bererber, S.M., et al., "Design of a CDMA System in FPGA Technology", Vehicular Technology Conference, 2007. VTC2007-Spring. IEEE 65$^{TH}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp._ 1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Surejection:, From MathWorld—AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H., Dynamic Galois Theory., Journal of Symbolic Computation; Dec. 2010, vol. 45 Issue 12, p. 1316-1329, 14p.

Taylor, F.J., "Residue Arithmetic A Tutorial with Examples", Computer, vol. 17, No. 5, pp. 50-62, May 1984, doi: 10.1109/MC. 1984. 1659138.

Socek, D., et al., Short Paper: Enhanced 1-D Chaotic Key Based Algorithm for Image Encryption, Sep. 2005, IEEE.

Information about Related Patents and Patent Applications, see section 6 of the accompanying Information Disclosure Statement Letter, which concerns Related Patents and Patent Applications.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

U.S. Appl. No. 11/675,120, filed Feb. 15, 2007, Low Level Sequence as an Anti-Tamper Mechanism.

U.S. Appl. No. 11/751,875, filed May 22, 2007, Encryption via Induced Unweighted Errors.

U.S. Appl. No. 11/832,160, filed Aug. 1, 2007, Chaotic Spread Spectrum Communications System Receiver.

U.S. Appl. No. 12/026,217, filed Feb. 5, 2008, Cryptographic System Incorporating a Digitally Generated Chaotic Numerical Sequence.

U.S. Appl. No. 12/056,024, filed Mar. 26, 2008, Selective Noise Cancellation of a Spread Spectrum Signal.

U.S. Appl. No. 12/117,086, filed May 8, 2008, Cryptographic System Including a Mixed Radix Number Generator With Chosen Statistical Artifacts.

U.S. Appl. No. 12/116,104, filed May 6, 2008, A Closed Galois Field Cryptographic System.

U.S. Appl. No. 12/131,386, filed Jun. 2, 2008, Adaptive Correlation.

U.S. Appl. No. 12/027,658, filed Feb. 7, 2008, Cryptographic System Configured to Perform a Mixed Radix Conversion With a Priori Defined Statistical Artifacts.

U.S. Appl. No. 12/137,593, filed Jun. 12, 2008, Featureless Coherent Chaotic Amplitude Modulation.

U.S. Appl. No. 12/129,197, filed May 29, 2008, Digital Generation of an Accelerated or Decelerated Chaotic Numerical Sequence.

U.S. Appl. No. 12/496,214, filed Jul. 1, 2009, Anti-Jam Communications Having Selectively Variable Peak-To-Average Power Ratio Including a Chaotic Constant Amplitude Zero Autocorrelation Waveform.

U.S. Appl. No. 12/507,111, filed Jul. 22, 2009, Adaptive Link Communications Using Adaptive Chaotic Spread Waveform.

U.S. Appl. No. 12/480,264, filed Jun. 8, 2009, Continuous Time Chaos Dithering.

U.S. Appl. No. 12/481,704, filed Jun. 10, 2009, Discrete Time Chaos Dithering.

U.S. Appl. No. 12/345,163, filed Dec. 29, 2008, Communications System Employing Chaotic Spreading Codes With Static Offsets.

U.S. Appl. No. 12/344,962, filed Dec. 29, 2008, Communications System Employing Orthogonal Chaotic Spreading Codes.

U.S. Appl. No. 12/396,828, filed Mar. 3, 2009, Communications System Employing Orthogonal Chaotic Spreading Codes.

U.S. Appl. No. 12/496,170, filed Jul. 1, 2009, Permission-Based Multiple Access Communications Systems.

U.S. Appl. No. 12/496,233, filed Jul. 1, 2009, Permission-Based Secure Multiple Access Communication Systems.

U.S. Appl. No. 12/507,512, filed Jul. 22, 2009, Permission-Based TDMA Chaotic Communication Systems.

U.S. Appl. No. 12/496,085, filed Jul. 1, 2009, High-Speed Cryptographic System Using Chaotic Sequences.

U.S. Appl. No. 12/496,123, filed Jul. 1, 2009, Rake Receiver for Spread Spectrum Chaotic Communications Systems.

U.S. Appl. No. 12/496,146, filed Jul. 1, 2009, Symbol Estimation for Chaotic Spread Spectrum Signal.

U.S. Appl. No. 12/480,316, filed Jun. 8, 2009, Symbol Duration Dithering for Secured Chaotic Communications.

U.S. Appl. No. 12/496,183, filed Jul. 1, 2009, Bit Error Rate Reduction in Chaotic Communications.

U.S. Appl. No. 12/248,131, filed Oct. 9, 2008, Ad-Hoc Network Acquisition Using Chaotic Sequence Spread Waveform.

U.S. Appl. No. 12/201,021, filed Aug. 29, 2008, Multi-Tier Ad-Hoc Network Communications.

U.S. Appl. No. 12/721,982, filed Mar. 11, 2010, Hidden Markov Model Detection for Spread Spectrum Waveforms.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

* cited by examiner

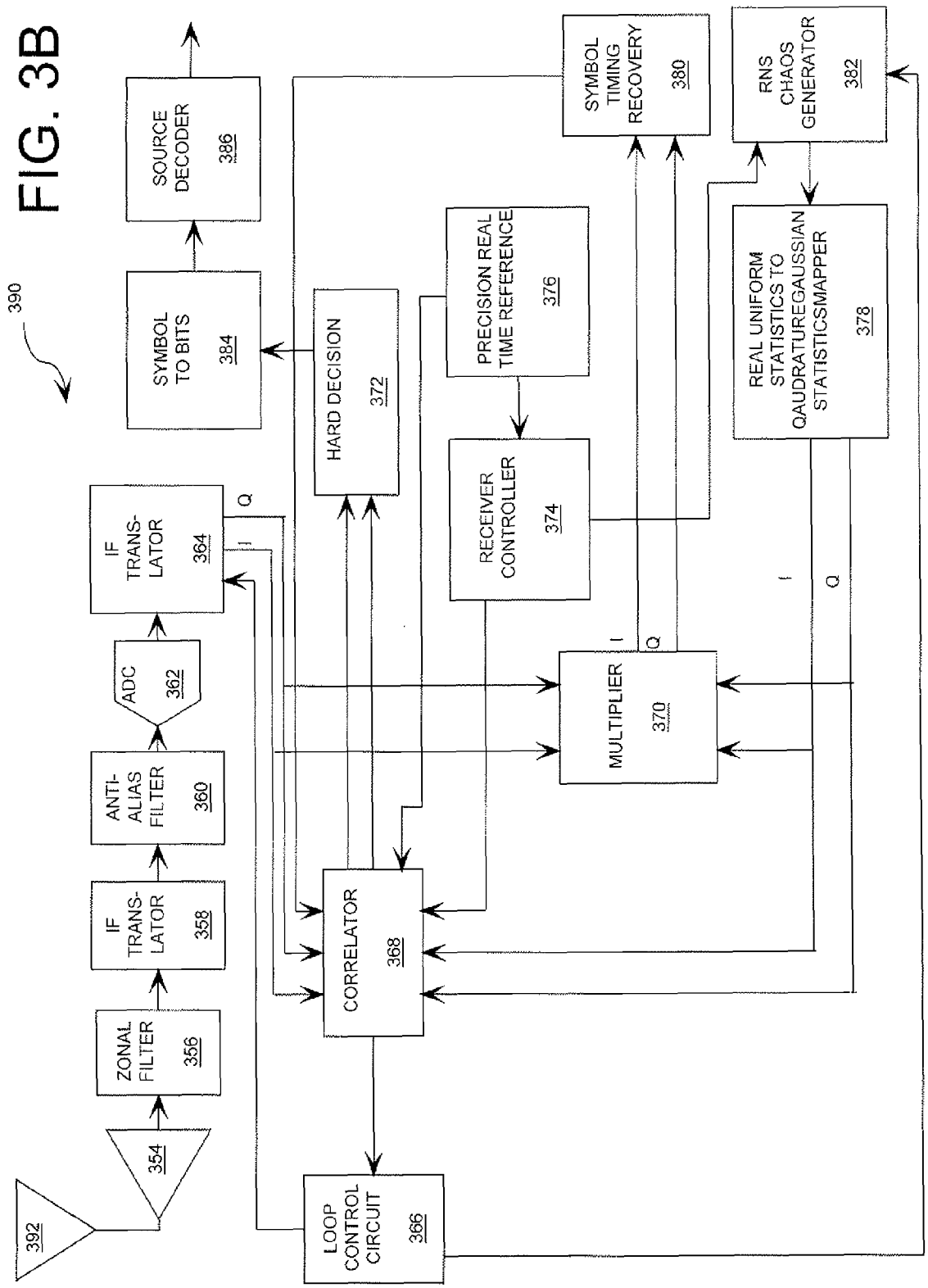

AD-HOC NETWORK ACQUISITION USING CHAOTIC SEQUENCE SPREAD WAVEFORM

BACKGROUND OF THE INVENTION

1. Statement of the Technical Field

The inventive arrangements concern wireless networks. More particularly, the invention relates to a system and method for the detection of wireless network nodes existing within a communications range.

2. Description of the Related Art

Wireless ad-hoc networks are known in the art. They generally include a class of networks in which wireless communications are used to link a plurality of nodes, which can be mobile. The term "node" as used herein refers to a device configured to establish a connection to another device in a wireless network. Such devices often include servers, hand-held communications devices, mounted communications devices, sensor devices, relay devices, coordination devices, satellites and the like. Each node includes a transmitter and receiver. Significantly, each node can function as a router and/or as a host. In operation, each node is configured to communicate directly with other nodes (i.e. without the use of a centralized access point). The topology of the ad-hoc network is not fixed and various nodes automatically reconfigure themselves to function as routers on an as needed basis. Packetized data communicated in the network can travel from a source node to a destination node either directly, or through some set of intermediate packet forwarding nodes.

In order for an ad-hoc network to function properly, the nodes must be able to identify the presence of neighboring nodes in the network. Consequently, nodes are typically configured to execute a defined procedure to locate unconnected nodes in the network and determine paths through the network through which data traffic can be communicated from a source node to a destination node. These procedures can also be useful for detecting the departure of nodes from the network and identifying alternative paths through the network when such departures do occur.

One common method for identifying neighbor nodes involves the use of "beacons". The term "beacon" as used herein refers to any wireless communication that is generated by a network node, and which can be potentially received by some or all nodes comprising the network for purposes of initiating discovery of unconnected nodes in the network. Thus, the beacon transmission is not necessarily intended to be received by any particular node, but can instead be selected so it can be received by any node within transmission range of the source node. Various types of information are advantageously included within the beacon signal. For example, the beacon signal can identify the source of the beacon signal by means of some identification code, can identify transmission and receive frequencies to be used, and various other communication protocols.

Various different types of beacon systems have been devised for use in ad-hoc networks. Some systems use only a limited number of selected nodes in the network to perform the beacon function whereas in other systems, all nodes can transmit a beacon. Some systems transmit a beacon signal in an omni-directional pattern to communicate with nodes in all directions. Other systems use a sectorized approach to selectively transmit a beacon signal only in pre-defined directions. When a beacon signal is received by a neighboring node, the beacon indicates to the receiving node that a neighbor node is present. Still other networks are designed to use a periphery-based approach where designated nodes located near peripheral areas of the network are selected to perform network acquisition processing for the entire network.

Neighbor discovery in an ad-hoc network is a key step to establishing network communications. Accordingly, beacon signals must be sent in such a way as to ensure a high likelihood that they will be received by other nodes in the network. In this regard, it is often desirable to transmit beacon signals at well defined intervals and relatively high power levels. Consequently, the beacon transmissions are very much subject to detection and interception by adversaries. Notably, in a combat environment, an adversary can exploit this information in a variety of ways. Therefore, a need exists for systems and methods to enable nodes to perform neighbor discovery with a low probability of exploitation.

One method for minimizing detection and interception of beacon signals involves the use of spreading sequences, which distribute the energy of the beacon signal over a wide bandwidth. Such a system is described in U.S. Pat. No. 7,269,198 to Elliott et al. The system described therein transmits a spread spectrum signal comprised exclusively of a spreading sequence, without any associated beacon data. The spreading sequence is transmitted at very low power to avoid detection and/or interception of the beacon signal by adversaries. However, the low power of the beacon signal means that, in order to be received by neighboring nodes, substantial amounts of processing gain is needed. This processing gain is achieved using "relatively long" spreading sequences. The large amounts of processing gain are advantageous, but necessarily limit the amount of data that can be transmitted. This is due to the fact that the data rate must be much lower than chipping rate that is associated with the spreading sequence. Accordingly, there remains a need for discovering neighbor nodes in ad-hoc wireless networks using beacon signals that have a low probability of detection/interception, but which also have the ability to communicate sufficient amounts of network data to immediately initiate communications. In this regard, detectability is further reduced by increasing the probability that any given neighbor discovery message will be properly received by an intended receiver, limiting the number of transmissions required to initiate communications.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate sufficiently large chaotic number sequences requires an impractical implementation due to the precision required.

Communications systems utilizing chaotic sequences offer promise for being the basis of a next generation of low probability of intercept (LPI) waveforms, low probability of detection (LPD) waveforms, and secure waveforms. While many such communications systems have been developed for generating chaotically modulated waveforms, such communications systems suffer from low throughput. The term "throughput" as used herein refers to the amount of data transmitted over a data link during a specific amount of time. This throughput limitation stems from the fact that a chaotic signal is produced by means of a chaotic analog circuit subject to drift.

The throughput limitation with chaos based communication systems can be traced to the way in which chaos generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift" as used herein refers to a slow long term variation in one or more parameters of a circuit. The problem with such analog circuits is that the inherent drift forces the requirement that state information must be constantly transferred over a communication channel to keep a transmitter and receiver adequately synchronized.

The transmitter and receiver in coherent chaos based communication systems are synchronized by periodically exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

The alternative to date has been to implement non-coherent chaotic waveforms. However, non-coherent waveform based communication systems suffer from reduced throughput and error rate performance. In this context, the phrase "non-coherent waveform" means that the receiver is not required to reproduce any synchronized copy of the chaotic signals that have been generated in the transmitter. Further, many non-coherent chaotic waveforms embed additional information in the signal that may be exploited by an unintended receiver to gain partial information of the transmission. The phrase "communications using a coherent waveform" means that the receiver is required to reproduce a synchronized copy of the chaotic signals that have been generated in the transmitter.

SUMMARY OF THE INVENTION

The invention concerns a method for identifying neighbor nodes in an ad-hoc wireless network including a plurality of nodes. The method involves generating a beacon signal at a first node of the network for alerting other nodes in the network of the presence of the first node. A digitally generated first spreading sequence is also generated at the first node. Thereafter, the beacon signal is modulated with the first spreading sequence to produce a spread spectrum signal which is then transmitted. The spreading sequence is selected to be a chaotic sequence.

According to one aspect of the invention, the beacon signal is modulated to include beacon data, exclusive of the spreading sequence, identifying one or more communication protocol parameters associated with the ad-hoc network. For example, the communication protocol parameters can include data transmission rate, transmission frequency, receive frequency, transmission time and timing, quality of service parameter, bit error rate parameter, bandwidth, a position of a node, a node velocity, and a node acceleration.

The spread spectrum signal is received at one or more second nodes in the network which coherently demodulate the spread spectrum signal using a second spreading sequence. The second spreading sequence is digitally generated at the second node and is advantageously used to recover the original beacon signal. The beacon signal is used at the second node to identify the first node as a neighbor node. Thereafter, a response message is transmitted from the second node to the first node in response to the beacon signal. According to one aspect of the invention, the beacon signal is transmitted from the first node using an omni-directional antenna and the response message is transmitted from the second node to the first node using a directional antenna. Following a neighbor discovery process, the method can continue with transmitting of network data between the first and the second node exclusive of using the first or second spreading sequence for modulating the network data.

In some embodiments of the invention, the step of generating a digitally generated chaotic spreading sequence includes the step of selecting a plurality of polynomial equations, and using residue number system (RNS) arithmetic operations to respectively determine a plurality of solutions for the plurality of polynomial equations. This step also includes iteratively computing the plurality of solutions expressed as RNS residue values. The step of generating the digitally generated chaotic spreading sequence also includes determining a series of digits in a weighted number system based on the RNS residue values.

The invention also includes an ad-hoc network including a plurality of nodes which is configured for carrying out the methods described herein. At least a first node is provided that includes a processor configured to generate a beacon signal for alerting other nodes in the network of the presence of the first node. The first node also includes a first spreading sequence generator for digitally generating a chaotic first spreading sequence, and a first modulator configured for modulating the beacon signal with the first digital spreading sequence to produce a spread spectrum signal.

BRIEF DESCRIPTION OF THE DRAWINGS

Embodiments will be described with reference to the following drawing figures, in which like numerals represent like items throughout the figures, and in which:

FIG. 3B is a block diagram of another embodiment of the receiver shown in FIG. 1 that is useful for understanding the invention.

DETAILED DESCRIPTION OF THE PREFERRED EMBODIMENTS

Figure 1:
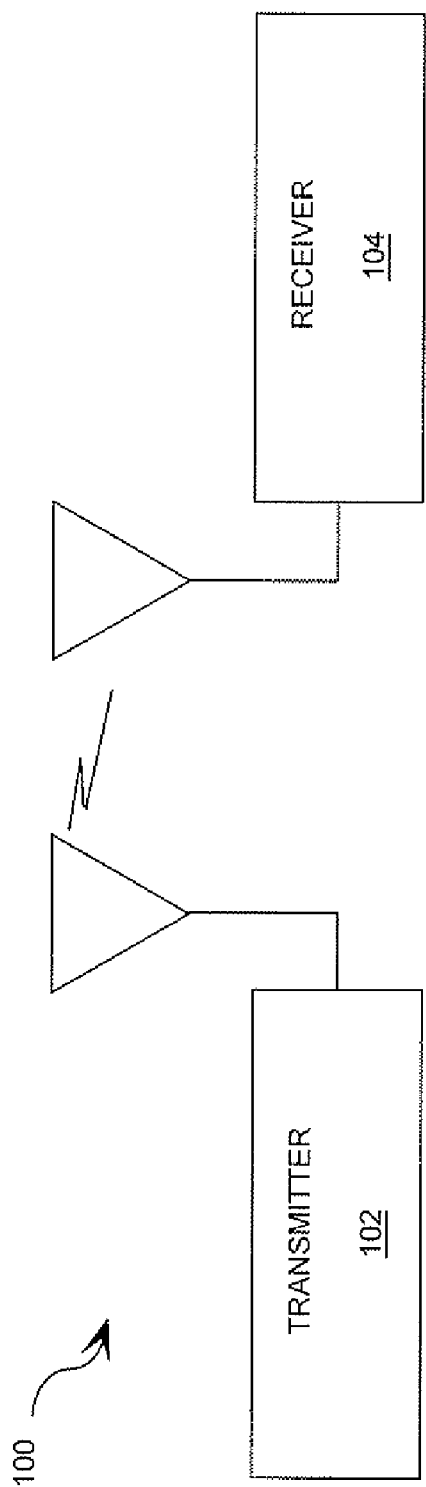
FIG. 1 is a block diagram of a coherent chaotic spread-spectrum communication system that is useful for understanding the invention.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment or a hardware/software embodiment.

In an ad-hoc wireless network, individual nodes comprising the network must be able to locate and identify neighboring nodes. In conventional wireless ad-hoc networks, this process of identifying neighbor nodes is accomplished by using beacon signals. The beacon signals are typically broadcast at pre-determined timing intervals and at relatively high power to ensure that neighbor nodes are adequately identified. While this system works well, the high power and repetitive nature of such beacon signals makes them prone to being exploited. Some have tried to solve this problem by simply transmitting a direct sequence spread spectrum signal at very low power, absent of the communication protocol data that is normally included in a beacon signal. The very low power, direct sequence spread spectrum transmissions offer low probability of intercept and detection. However, such signals suffer from an important limitation, which is a very low data rate. Consequently, it is difficult to include any significant amount of network protocol data in the beacon signal.

In contrast, the present invention uses a digitally generated chaotic spreading sequence to produce a spread spectrum transmission containing the neighbor discovery data, which may include network initialization parameters like timeslots, transmission frequencies, network characteristics, or routing tables. The digitally generated chaotic spreading sequence has the advantage of providing low probability of intercept and detection, while also permitting relatively high data rates to be maintained. This is accomplished because spread spectrum signals produced using digitally generated chaos as a spreading sequence are more difficult to detect as compared to conventional direct sequence spreading codes. Chaotic sequence based waveforms do not have the cyclical features common in conventional direct sequence spread waveforms. Accordingly, higher power beacon transmissions can be provided without sacrificing data rate or increasing exploitability. Consequently, higher data rates can be used in conjunction with the spread spectrum beacon signal without sacrificing the desirable features of low probability of intercept and low probability of detection.

Prior to describing in detail the way in which digitally generated chaotic sequences can be used advantageously in ad-hoc networks, it is helpful to understand more generally how digitally generated chaotic sequences can be used to implement spread spectrum communication systems. Accordingly, such a system shall be hereinafter described. Based on the discussion below, it will be appreciated by those skilled in the art that the techniques described herein can be used to communicate beacon signals in an ad-hoc network.

Spread Spectrum Communications Transceivers Using Chaotic Sequence

A digital chaos based spread spectrum communications system will now be described with respect to FIG. 1 through FIG. 3B. The communication system disclosed herein utilizes a coherent chaotic sequence spread spectrum (CCSSS) method. Prior to being transmitted, data symbols are combined with a higher rate chaotic sequence that spreads the spectrum of the data according to a spreading ratio. The resulting signal resembles a truly random signal, but this randomness can be removed at the receiving end to recover the original data. In particular, the data is recovered by despreading the received signal using the same chaotic sequence which is generated at a receiver. The CCSSS system in relation to FIGS. 1 through 3B channel encodes a baseband carrier with PSK symbols. The channel encoding is one of two operations commonly known as modulation. The other operation commonly known as modulation is mixing times a local oscillator or other sequence which results in frequency translation and is also used herein.

The CCSSS system also modulates the phase modulated carrier in a chaotic manner utilizing a string of discrete time chaotic samples. The discrete time chaotic samples shall hereinafter be referred to as "chips". As will be appreciated by those familiar with direct sequence spread spectrum (DSSS) systems, each chip will generally have a much shorter sample time interval than the duration of each of the information symbols. Thus it will be understood that the carrier is modulated using the chaotic sequence chips. Moreover, it will be understood that the chip rate associated with the chaotic sequence is much higher than the symbol rate. It should also be understood that the chaotic sequence of chips which are utilized for generating the transmitted signal is known a priori by the receiver. Consequently, the same chaotic sequence can be used at the receiver to reconstruct the non-spread carrier or remove the effect of spreading at the receiver.

System Overview

Referring now to FIG. 1, there is provided a coherent chaotic spread-spectrum communication system 100 that is useful for understanding the present invention. The coherent chaotic spread-spectrum communication system 100 is comprised of a transmitter 102 and a receiver 104. The transmitter 102 is configured to generate an amplitude-and-time-discrete baseband signal and to spread the amplitude-and-time-discrete baseband signal over a wide intermediate frequency band. This spreading consists of multiplying the amplitude-and-time-discrete baseband signal by a digital chaotic sequence. The product of this arithmetic operation is hereinafter referred to as a digital chaotic signal. In this regard, it should be understood that the transmitter 102 is also configured to process the digital chaotic signal to place the same in a proper analog form suitable for transmission over a communications link. The transmitter 102 is further configured to communicate analog chaotic signals to the receiver 104 via a communications link. The transmitter 102 will be described in greater detail below in relation to FIG. 2.

The receiver 104 is configured to receive transmitted analog chaotic signals from the transmitter 102. The receiver 104 is also configured to down convert, digitize, and de-spread a transmitted analog chaotic signal by correlating it with a replica of the chaotic sequence generated at the transmitter 102. The chaotic sequence is also time synchronized to the transmitted analog chaotic signal: i.e., a sampling rate of the chaotic sequence is the same as a sampling rate of the transmitted analog chaotic signal and is synchronized with a clock (not shown) of the transmitter 102. The output of the arithmetic operation that de-spreads the received signal is hereinafter referred to as a de-spread signal. In this regard, it should be understood that the receiver 104 is further configured to process a de-spread signal for obtaining data contained therein. The receiver 104 is configured to convert the data into useful payload information (such as beacon data) that can be used to identify the presence of neighbor nodes. The receiver 104 is described in greater detail below in relation to FIGS. 3A and 3B.

Transmitter Detail

Figure 2:
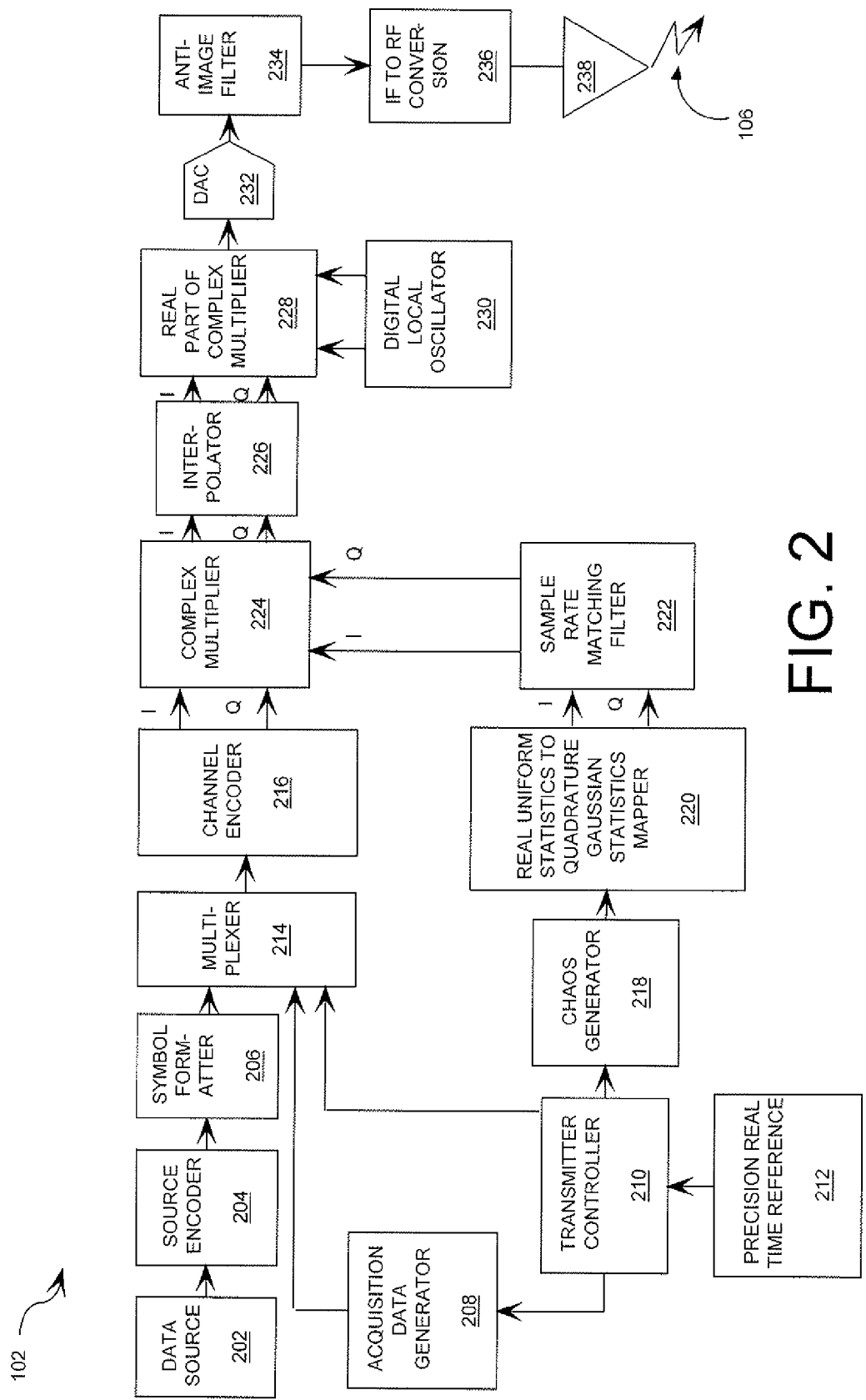
FIG. 2 is a block diagram of the transmitter shown in FIG. 1 that is useful for understanding the invention.

Referring now to FIG. 2, there is provided a bock diagram of the transmitter 102 shown in FIG. 1 that is useful for understanding the invention. It should be noted that the embodiment of FIG. 2 assumes that: (1) a low order phase shift keying (PSK) data modulation is used; (2) no pulse shaping is applied to data symbols; (3) modulated data symbols are generated in quadrature form; and (4) chaotic spectral spreading is performed at an intermediate frequency (IF).

Referring again to FIG. 2, the transmitter 102 is comprised of a data source 202. The transmitter 102 is also comprised of a source encoder 204, a symbol formatter 206, an acquisition data generator 208, a transmitter controller 210, a multiplexer 214, a channel encoder 216, a precision real time reference 212, and a digital complex multiplier 224. The transmitter 102 is further comprised of a chaos generator 218, a real uniform statistics to quadrature Gaussian statistics mapper device (RUQG) 220, and a sample rate matching filter (SRMF) 222. The transmitter 102 is further comprised of an interpolator 226, a digital local oscillator (LO) 230, a real part of a complex multiplier 228, a digital-to-analog converter (DAC) 232, an anti-image filter 234, an intermediate frequency (IF) to radio frequency (RF) conversion device 236, and an antenna element 238. Each of the above listed components 202-216, 220-238 are well known to persons skilled in the art. Thus, these components will not be described in great detail herein. However, a brief discussion of the transmitter 102 architecture is provided to assist a reader in understanding the present invention.

Referring again to FIG. 2, the data source 202 is configured to receive bits of data from an external data source (not shown) as bits of data. In this regard, it should be appreciated that the data source 202 is an interface configured for receiving an input signal containing data from an external device (not shown). The data source 202 is further configured to supply bits of data to the source encoder 204 at a particular data transfer rate. The source encoder 204 can be configured to encode the data received from the external device (not shown) using a forward error correction coding scheme. The bits of data received at or generated by the source encoder 204 represent any type of information that may be of interest to a user. For purposes of the present invention, the data include beacon information used to identify the existence of neighbor nodes. However, it will be appreciated that the invention is not limited in this regards. The source encoder 204 is further configured to supply bits of data to the symbol formatter 206 at a particular data transfer rate.

The symbol formatter 206 is configured to process bits of data for forming channel encoded symbols. In a preferred embodiment, the source encoded symbols are phase shift keyed (PSK) encoded. If it is desired to use a non-coherent form of PSK with the coherent chaos spread spectrum system, then the symbol formatter 204 can also be configured to differentially encode formed PSK symbols. Differential encoding is well known to persons skilled in the art and therefore will not be described in great detail herein. The symbol formatter 206 can be further configured to communicate non-differentially encoded PSK symbols and/or differentially encoded PSK symbols to the multiplexer 214. Still, the invention is not limited in this regard.

According to an embodiment of the invention, the symbol formatter 206 is functionally similar to a serial in/parallel out shift register where the number of parallel bits out is equal to log base two ($\log_2$) of the order of the channel encoder 216. In this regard, the symbol formatter 206 is selected for use with a quadrature phase shift keying (QPSK) modulator. As such, the symbol formatter 206 is configured to perform a QPSK formatting function for grouping two (2) bits of data together to form a QPSK symbol (i.e., a single two bit parallel word). Thereafter, the symbol formatter 206 communicates the encoded QPSK symbol to the multiplexer 214. Still, the invention is not limited in this regard.

According to another embodiment of the invention, the symbol formatter 206 is functionally similar to a serial in/parallel out shift register where the number of parallel bits out is equal to log base two ($\log_2$) of the order of the channel encoder 216. In this regard, the symbol formatter 206 is selected for use with a binary phase shift keying (BPSK) modulator. As such, the symbol formatter 206 is configured to map one bit of data to a BPSK symbol. Thereafter, the symbol formatter 206 communicates the BPSK symbol to the multiplexer 214. Still, the invention is not limited in this regard.

According to another embodiment of the invention, the symbol formatter 206 is selected for use with a sixteen quadrature amplitude modulation (16 QAM) modulator. As such, the symbol formatter 206 is configured to map four (4) bits to a 16 QAM symbol. Thereafter, the symbol formatter 206 communicates the 16 QAM symbol to the multiplexer 214. Still, the invention is not limited in this regard. For example, and without limitation, an embodiment of the invention can also utilize pulse amplitude modulation.

According to another embodiment of the invention, the symbol formatter 206 is selected for use with a binary amplitude shift keying (ASK) modulator. As such, the symbol formatter 206 is configured to map one bit of data to a ASK symbol. Thereafter, the symbol formatter 206 communicates the ASK symbol to the multiplexer 214. Still, the invention is not limited in this regard.

The transmitter 102 also includes an acquisition data generator 208 capable of generating a "known data preamble" that can be used to enable initial synchronization of a chaotic sequence generated in the transmitter 102 and the receiver 104. The duration of this "known data preamble" is determined by an amount required by the receiver 104 to synchronize with the transmitter 102 under known worst case channel conditions. In some embodiments of the invention, the "known data preamble" is a repetition of the same known symbol. In other embodiments of the invention, the "known data preamble" is a series of known symbols. The acquisition data generator 208 can be further configured to communicate the "known data preamble" to the multiplexer 214.

Referring again to FIG. 2, the multiplexer 214 is configured to receive the binary word to be modulated by the channel encoder from the symbol formatter 206. The multiplexer 214 is also configured to receive a "known data preamble" from the acquisition data generator 208. The multiplexer 214 is coupled to the transmitter controller 210. The transmitter controller 210 is configured to control the multiplexer 214 so that the multiplexer 214 routes the "known data preamble" to the channel encoder 216 at the time of a new transmission.

According to an alternative embodiment of the invention, the "known data preamble" is stored in a modulated form. In such a scenario, the architecture of FIG. 2 is modified such that the multiplexer 214 exists after the channel encoder 216. Still, the invention is not limited in this regard.

According to another embodiment of the invention, the "known data preamble" may be injected at known intervals to aid in periodic resynchronization of the chaotic sequence generated in the transmitter 102 and the receiver 104. This would typically be the case for an implementation meant to operate in harsh channel conditions. Still, the invention is not limited in this regard.

Referring again to FIG. 2, the multiplexer 214 is configured to select the data symbols to be routed to the channel encoder 216 after a preamble period has expired. The multiplexer 214 is also configured to communicate the data symbols to the channel encoder 216. In this regard, it should be appreciated that a communication of the data symbols to the channel encoder 216 is delayed by a time defined by the length of the "known data preamble." As should be appreciated, this delay allows all of a "known data preamble" to be fully communicated to the channel encoder 216 prior to communication of the data symbols.

Referring again to FIG. 2, the channel encoder 216 is configured to perform actions for representing the "known data preamble" and the data symbols in the form of a modulated amplitude-and-time-discrete digital signal. The modulated amplitude-and-time-discrete digital signal is defined by digital words which represent intermediate frequency (IF) modulated symbols comprised of bits of data having a one (1) value or a zero (0) value. Methods for representing digital symbols by an amplitude-and-time-discrete digital signal are well known to persons skilled in the art. Thus, such methods will not be described in great detail herein. However, it should be appreciated that the channel encoder 216 can employ any such method. For example, the channel encoder 216 can be selected as a digital baseband modulator employing quadrature phase shift keying (QPSK). As will be appreciated by those skilled in the art, the output of the QPSK modulator will include an in-phase ("I") data and quadrature phase ("Q") data. The I and Q data will be thereafter communicated to the digital complex multiplier 224.

According to an embodiment of the invention, the transmitter 102 is further comprised of a sample rate matching device (not shown) between the channel encoder 216 and the digital complex multiplier 224. The sample rate matching device (not shown) is provided for resampling the amplitude-and-time-discrete digital signal. As should be appreciated, the sample rate matching device (not shown) performs a sample rate increase on the amplitude-and-time-discrete digital signal so that a sample rate of the amplitude-and-time-discrete digital signal is the same as a digital chaotic sequence communicated to the digital complex multiplier 224. Still, the invention is not limited in this regard.

Referring again to FIG. 2, the digital complex multiplier 224 performs a complex multiplication in the digital domain. In the digital complex multiplier 224, the amplitude-and-time-discrete digital signal from the channel encoder 216 is multiplied by a digital representation of a chaotic sequence. The chaotic sequence is generated in the chaos generator 218. The rate at which the digital chaotic sequence is generated is an integer multiple of a data symbol rate. The greater the ratio between the data symbol period and the sample period of the digital chaotic sequence, the higher a spreading ratio. The chaos generator 218 communicates the chaotic sequence to a sequence statistical conversion RUQG 220. The RUQG 220 is configured to statistically transform a digital chaotic sequence into a transformed digital chaotic sequence with chosen statistical properties. The transformed digital chaotic sequence can have a characteristic form including combinations of real, complex, or quadrature, being of different word widths, and having different statistical distributions. For example, the RUQG 220 may take in two (2) uniformly distributed real inputs from the chaos generator 218 and convert those via a complex-valued bivariate Gaussian transformation to a quadrature output having statistical characteristics of additive white Gaussian noise. Such conversions are well understood by those skilled in the art, and therefore will not be described in great detail herein. However, it should be understood that such techniques may use nonlinear processors, look-up tables, iterative processing (CORDIC functions), or other similar mathematical processes. The RUQG 220 is further configured to communicate transformed chaotic sequences to the SRMF 222.

The statistically transformed output of the digital chaotic sequence has a multi-bit resolution consistent with a resolution of the DAC 232. The RUQG 220 communicates the statistically transformed output of the digital chaotic sequence to the SRMF 222. For example, the RUQG 220 communicates an in-phase ("I") data and quadrature phase ("Q") data to the SRMF 222 when the channel encoder 216 is configured to yield a complex output representation. Still, the invention is not limited in this regard.

If a chaos sample rate of the transformed chaotic sequence is different than a sample rate of the amplitude-and-time-discrete digital signal, then the two rates must be matched. The chaotic sequence can therefore be resampled in the SRMF 222. For example, SRMF 222 can be comprised of a real sample rate matching filter to resample each of the in-phase and quadrature-phase processing paths of the chaotic sequence. As should be appreciated, the SRMF 222 performs a sample rate change on the transformed digital chaotic sequence so that a sample rate of the transformed digital chaotic sequence is the same as an amplitude-and-time-discrete digital signal communicated to the digital complex multiplier 224 from the channel encoder 216. The SRMF 222 is also configured to communicate a resampled, transformed digital chaotic sequence to the digital complex multiplier 224.

According to an embodiment of the invention, the RUQG 220 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical expressions (1) and (2), which is commonly known as the Box-Muller transformation.

$$G_1 = \sqrt{-2\log(u_1)} \cdot \cos(2\pi u_2) \qquad (1)$$

$$G_2 = \sqrt{-2\log(u_1)} \cdot \sin(2\pi u_2) \qquad (2)$$

where {u1, u2} are uniformly distributed independent input random variables and {$G_1$, $G_2$} are Gaussian distributed output random variables. In such a scenario, the SRMF 222 is comprised of one sample rate matching filter to resample an in-phase ("I") data sequence and a second sample rate matching filter to resample a quadrature-phase ("Q") data sequence. The SRMF 222 is configured to communicate a resampled, transformed digital chaotic sequence to the digital complex multiplier 224. More particularly, the SRMF 222 communicates an in-phase ("I") data and quadrature phase ("Q") data to the digital complex multiplier 224. Still, the invention is not limited in this regard.

According to another embodiment of the invention, the amplitude-and-time-discrete digital signal and the digital chaotic sequence are generated as zero intermediate frequency (IF) signals. Also, pulse shaping is not employed. In such a scenario, the sample rate matching device (not shown) between the channel encoder 216 and the digital complex multiplier 224 is not required. Still, the invention is not limited in this regard.

The digital complex multiplier 224 performs a complex multiplication on the digital chaotic sequence output from the SRMF 222 and the amplitude-and-time-discrete digital signal output from the channel encoder 216. The resulting output is a digital representation of a coherent chaotic sequence spread spectrum modulated IF signal in which the digital data from the channel encoder 216 has been spread over a wide frequency bandwidth in accordance with a chaotic sequence generated by the chaos generator 218.

The digital complex multiplier 224 is configured to combine a digital chaotic sequence with an amplitude-and-time-discrete digital signal using an arithmetic operation. The arithmetic operation is selected as a complex-valued digital multiplication operation. The complex-valued digital multiplication operation includes multiplying the amplitude-and-time-discrete digital signal by the digital chaotic sequence to obtain a digital chaotic output signal. The digital complex multiplier 224 is also configured to communicate digital chaotic output signals to the interpolator 226.

The interpolator 226, real part of complex multiplier 228 and quadrature digital local oscillator 230 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to those skilled in the art and shall not be discussed in detail here.

The interpolator 226 accepts an input from the complex multiplier 224. In a preferred embodiment the modulated symbols are in quadrature form and the interpolator is implemented as two real interpolators. Still, the invention is not limited in this regard.

The interpolator 226 raises the sample rate of the amplitude-and-time-discrete digital signal received from the complex multiplier 224 to a rate compatible with the bandwidth and center frequency of the second IF. The digital local oscillator 230 generates a complex quadrature amplitude-and-time-discrete digital sinusoid at a frequency which shall translate the first intermediate frequency (IF) to a desired second intermediate frequency (IF). The digital local oscillator 230 is also configured to pass its output to the real part of complex multiplier 228.

The real part of complex multiplier 228 is configured to accept as its inputs the quadrature output of the interpolator 228 and the quadrature output of the digital local oscillator 230. The real part of a complex multiplication is passed so that the real part of complex multiplier 228 implements only the real output portion of a complex multiplication. The real part of complex multiplier 228 is configured to pass its output to the DAC 232. Still, the invention is not limited in this regard.

According to an embodiment of the invention, the digital chaotic sequence and the amplitude-and-time-discrete digital signal are zero intermediate frequency (IF) signals. The digital chaotic sequence is used to amplitude modulate the "known data preamble" and the data symbols via an efficient instantiation of a complex multiplier. The result of this amplitude modulation process is a zero IF signal. Still, the invention is not limited in this regard.

Referring again to FIG. 2, the IF translator and specifically the real part of the complex multiplier 228 are configured to communicate a sampled digital chaotic output signal (i.e., a digital chaotic output signal having an increased sampling rate and non-zero intermediate frequency) to the DAC 232. The DAC 232 is configured to convert a sampled digital chaotic output signal to an analog signal. The DAC 232 is also configured to communicate an analog signal to the anti-image filter 234.

In some applications, it can be desirable to change a sampling rate at the output of the digital complex multiplier 224 only, for example when using an interpolating DAC. An IF translator consisting of an interpolator 226 only can be provided for this purpose.

According to an embodiment of the invention, the digital complex multiplier 224 multiplies I and Q data of an amplitude-and-time-discrete digital signal by I and Q data of digital chaotic sequence to obtain a digital chaotic output signal. The digital chaotic output signal is a quadrature, zero IF signal. The digital complex multiplier 224 communicates the quadrature, zero IF signal to the IF translator. The IF translator is an interpolation filter 226 only. The interpolation filter 226 is comprised of dual real interpolators which change the sample rate of the quadrature, zero IF signal to a predetermined rate, such as seventy (70) mega sample per second. The interpolation filter 226 communicates the sampled, quadrature, zero IF signal to the DAC 232. The DAC 232 is an interpolating DAC that increases the effective sample rate. According to an embodiment of the invention, the DAC 232 interpolates the received zero IF signal to a two hundred eighty (280) mega sample per second sample rate. The DAC 232 also up converts a real output component by a factor of the interpolated sample frequency (two hundred eighty (280) mega sample per second) divided four (4) before conversion to an analog signal. The output of the DAC 232 is thus a real signal centered at a seventy (70) mega hertz intermediate frequency with a first image centered at two hundred ten (210) mega hertz. Still, the invention is not limited in this regard.

Referring again to FIG. 2, the anti-image filter 234 is configured to remove spectral images from the analog signal to form a smooth time domain signal. The anti-image filter 234 is also configured to communicate a smooth time domain signal to a RF translator 236. The RF translator 236 is a wide bandwidth analog IF to RF up converter. The RF translator 236 is configured to center a smooth time domain signal at an RF for transmission thereby forming an RF signal. The RF translator 236 is also configured to communicate the RF signal to the power amplifier (not shown). The power amplifier (not shown) is configured to amplify a received RF signal. The power amplifier (not shown) is configured to communicate the amplified RF signal to the antenna element 238 for communication to a receiver 104 (described below in relation to FIG. 3A).

It should be understood that the digital generation of the digital chaotic sequence at the transmitter 102 and receiver 104 is kept closely coordinated under the control of a precision real time reference 212 clock. The higher the precision of the clock 212, the closer the synchronization of the chaos generator 218 of the transmitter 102 and the chaos generator (described below in relation to FIG. 3A) of the receiver 104 shall be excluding the effects of processing delay differences and channel propagation times. The use of a precision real time reference allows the states of the chaos generators to be easily controlled with precision.

Referring again to FIG. 2, the precision real time reference 212 is a stable local oscillator locked to a precision real time reference, such as a GPS clock receiver or a chip scale atomic clock (CSAC). The precision real time reference 212 is configured to supply a high frequency clock to the clocked logic circuits 206 through 232 while being locked to a lower frequency reference clock. The lower frequency reference clock supplies a common reference and a common real time of day reference to prevent a large drift between the states of the chaos generator 218 and the chaos generator (described below in relation to FIG. 3A) of the receiver 104 over an extended time interval.

A person skilled in the art will appreciate that the transmitter 102 is one architecture of a communications system transmitter. However, the invention is not limited in this regard and any other transmitter architecture can be used without limitation. For example, the transmitter 102 can include real first to second intermediate frequency (IF) translation instead of a quadrature first to second intermediate frequency (IF) translation. As another example, other architectures may employ additional chaotic sequence generators to provide a switched chaotic output or to control other aspects of the transmitter 102.

Receiver Detail

Figure 3A:
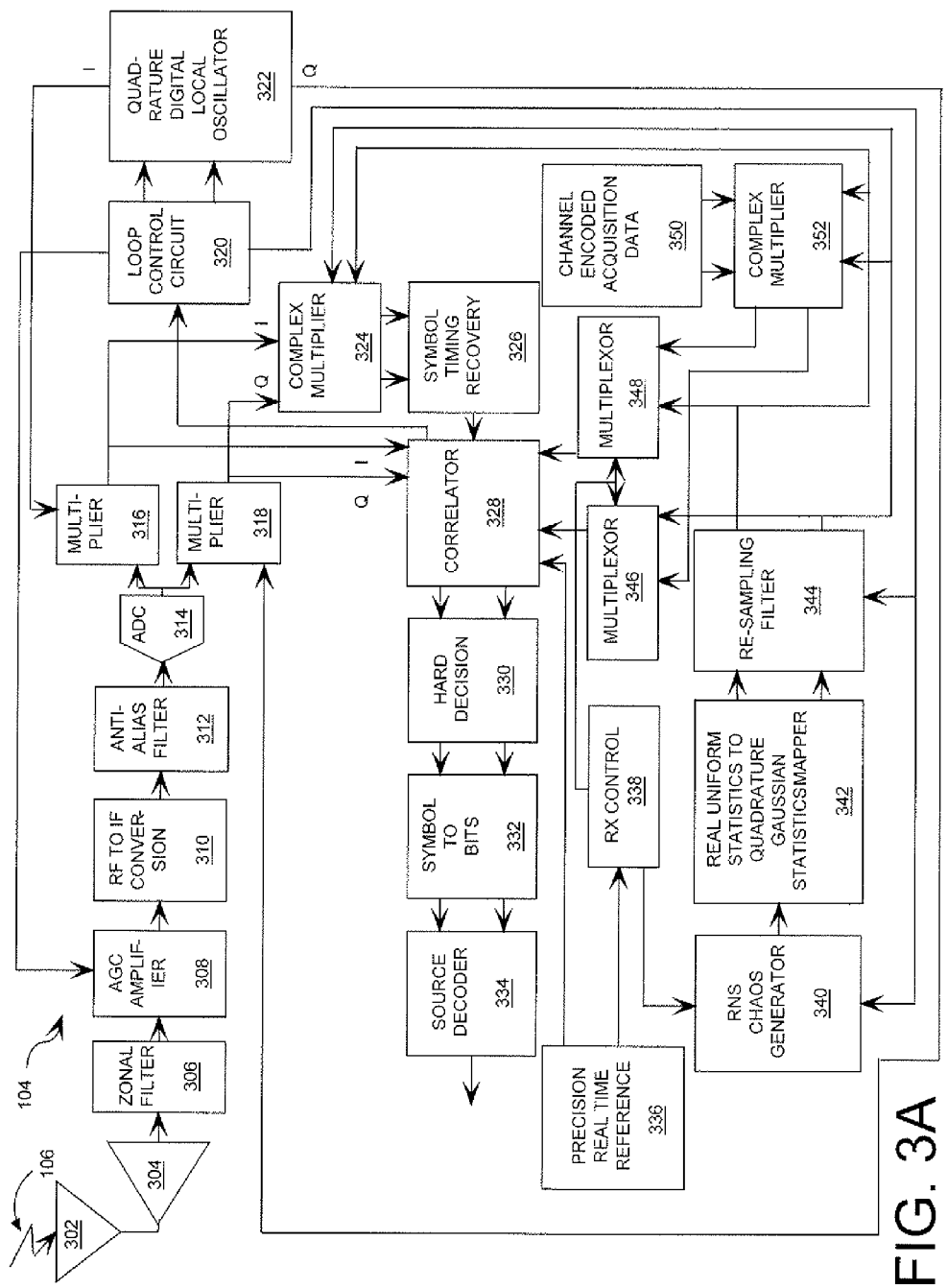
FIG. 3A is a block diagram of an embodiment of the receiver shown in FIG. 1 that is useful for understanding the invention.

Referring now to FIG. 3A, there is provided a block diagram of the receiver 104 of FIG. 1 that is useful for understanding the invention. It should be noted that in conventional analog based coherent communications systems analog chaos circuits are synchronized by periodically exchanging state information. The exchange of state information requires a substantial amount of additional bandwidth. This is what makes analog based coherent communications impracticable. The receiver 104 of FIG. 3A is designed to eliminate the drawbacks of conventional analog based coherent communications systems. In this regard it should be appreciated that the receiver 104 is comprised of a digital chaos generator. The receiver 104 includes a tracking loop for synchronizing its digital chaos generator and the digital chaos generator 218 of the transmitter 102. Most significantly, the receiver is configured to synchronize two (2) strings of discrete time chaotic samples (i.e., chaotic sequences) without using a constant or periodic transfer of state update information. A first string of discrete time chaotic samples is generated at the transmitter 102. A second string of discrete time chaotic samples is generated at the receiver 104.

Referring again to FIG. 3A, the receiver 104 is comprised of an antenna element 302, a low noise amplifier (LNA) 304, a zonal filter 306, an AGC amplifier 308, a radio frequency (RF) to intermediate frequency (IF) conversion device 310, an anti-alias filter 312, and an analog-to-digital (A/D) converter 314. The receiver 104 is also comprised of real multipliers 316, 318, a loop control circuit 320, a quadrature digital local oscillator 322, a correlator 328, a multiplexers 346, 348, a channel encoded acquisition data generator (CEADG) 350, digital complex multipliers 324, 352, and a symbol timing recovery circuit 326. The receiver 104 is further comprised of a receiver controller 338, a precision real time reference clock 336, a hard decision device 330, a symbol to bits (S/B) converter 332, and a source decoder 334. The receiver 104 is comprised of a chaos generator 340, a real uniform statistic to quadrature Gaussian statistic mapper (RUQG) 342, and a re-sampling filter 344. Each of the above listed components and circuits 302-318, 322-326, 330-338, 342-352 are well known to persons skilled in the art. Thus, these components and circuits will not be described in great detail herein. However, a brief discussion of the receiver 104 architecture is provided to assist a reader in understanding the present invention. It should be noted that when the receiver 104 is in both acquisition and tracking modes (described below) the receiver 104 is utilizing a novel architecture/algorithm.

Referring again to FIG. 3A, the antenna element 302 is configured to receive an analog input signal communicated from the transmitter 102 over a communications link. The antenna element 302 is also configured to communicate the analog input signal to the LNA 304. The LNA 304 is configured to amplify a received analog input signal while adding as little noise and distortion as possible. The LNA 304 is also configured to communicate an amplified, analog input signal to the zonal filer 306. Zonal filters are analog filters with slow roll off characteristic but low injection loss used to suppress large interfering signals outside of bands of interest. Zonal filters are well known to persons skilled in the art, and therefore will not be described in great detail herein. It should be appreciated that the zonal filter 306 is configured to communicate a filtered, analog input signal to the automatic gain control (AGC) amplifier 308. An automatic gain control (AGC) amplifier 308 is a controllable gain amplifier used to keep the magnitude of the received signal within normal bounds for the rest of the signal processing chain. Automatic gain control (AGC) amplifiers are well known to persons skilled in the art, and therefore will not be described in great detail herein. It should be appreciated that the automatic gain control (AGC) amplifier 308 is configured to communicate a gain adjusted, analog input signal to the RF to IF conversion device 310.

The RF to IF conversion device 310 is configured to mix the analog input signal to a preferred IF for conversion to a digital signal at the A/D converter 314. The RF to IF conversion device 310 is also configured to communicate a mixed analog input signal to the anti-alias filter 312. The anti-alias filter 312 is configured to restrict a bandwidth of a mixed analog input signal. The anti-alias filter 312 is also configured to communicate a filtered, analog input signal to the A/D converter 314. The A/D converter 314 is configured to convert a received analog input signal to a digital signal. The A/D converter 314 is also configured to communicate a digital input signal to a second IF translator which is comprised of the real multipliers 316, 318, and the programmable quadrature digital local oscillator 332.

The multiplier 316 is configured to receive a digital word as input from the A/D converter 314 and a digital word from the in-phase component of the quadrature digital local oscillator 322. The multiplier 316 multiplies the output of the A/D converter 314 by the in-phase component of the quadrature digital local oscillator 322. The multiplier 316 is also configured to communicate a digital output word. The multiplier 318 is configured to receive a digital word as input from the A/D converter 314 and a digital word from the quadrature-phase component of the quadrature digital local oscillator 322. The multiplier 318 multiplies the output of the A/D converter 314 by the quadrature-phase component of the quadrature digital local oscillator 322. The multiplier 318 is also configured to communicate a digital output word.

The quadrature digital local oscillator 322 generates a complex quadrature amplitude-and-time-discrete digital sinusoid at a frequency which shall translate the first IF to baseband and remove detected frequency and phase offsets in the resulting quadrature baseband signal. The quadrature digital local oscillator accepts as its inputs a binary phase control word and a binary frequency control word from the loop control circuit 320. Quadrature digital local oscillators are known to those skilled in the art, and therefore will not be described in detail herein.

The IF translator is configured to mix the digital input signal to a preferred IF for processing at the correlator 328 and the digital complex multiplier 324. The IF translator is also configured to communicate a digital input signal to the correlator 328 and the digital complex multiplier 324. As will be appreciated by those skilled in the art, the output of the IF translator can include an in-phase ("I") data and quadrature phase ("Q") data. As such, the IF translator can communicate I and Q data to the correlator 328 and the digital complex multiplier 324.

The digital complex multiplier 324 is configured to perform a complex multiplication in the digital domain. In the complex-valued digital multiplier 324, the digital input signal from the IF translator is multiplied by a digital representation of a chaotic sequence. The chaotic sequence is generated in the chaos generator 340. The chaos generator 340 communicates the chaotic sequence to an RUQG 342. In this regard, it should be appreciated that the chaos generator 340 is coupled to the receiver controller 338. The receiver controller 338 is configured to control the chaos generator 340 so that the chaos generator 340 generates a chaotic sequence with the correct initial state when the receiver 104 is in an acquisition mode and a tracking mode.

The RUQG 342 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in the preferred embodiment is a bivariate Gaussian distribution that converts two (2) independent uniformly distributed random variables to a pair of quadrature Gaussian distributed variables. The RUQG 342 is further configured to communicate transformed chaotic sequences to the re-sampling filter 344.

According to the embodiment of the invention, the RUQG 342 statistically transforms a digital chaotic sequence into a quadrature Gaussian form of the digital chaotic sequence. The RUQG 342 communicates the quadrature Gaussian form of the digital chaotic sequence to the re-sampling filter 344. More particularly, the RUQG 342 communicates an in-phase ("I") data and quadrature phase ("Q") data to the re-sampling filter 344. Still, the invention is not limited in this regard.

The re-sampling filter 344 is also configured to forward a transformed chaotic sequence to the digital complex multiplier 324. The re-sampling filter 344 is configured as a sample rate change filter for making the chaos sample rate compatible with the received signal sample rate when the receiver 104 is in acquisition mode. The re-sampling filter 344 is also configured to compensate for transmit and receive clock offsets with less than a certain level of distortion when the receiver is in a steady state demodulation mode. In this regard, it should be appreciated that the re-sampling filter 344 is configured to convert a sampling rate of in-phase ("I") and quadrature-phase ("Q") data sequences from a first sampling rate to a second sampling rate without changing the spectrum of the data contained in therein. The re-sampling filter 344 is further configured to communicate in-phase ("I") and quadrature-phase ("Q") data sequences to the digital complex multipliers 324, 352, and the multiplexers 346, 348.

It should be noted that if a sampled form of a chaotic sequence is thought of as discrete samples of a continuous band limited chaos then the re-sampling filter 344 is effectively tracking the discrete time samples, computing a continuous representation of the chaotic sequence, and resampling the chaotic sequence at the discrete time points required to match the discrete time samples sampled by the A/D converter 314. In effect, input values and output values of the re-sampling filter 344 are not exactly the same because the values are samples of the same waveform taken at slightly offset times. However, the values are samples of the same waveform so the values have the same power spectral density.

Referring again to FIG. 3A, the CEADG 350 is configured to generate a modulated acquisition sequence. The CEADG 350 is also configured to communicate a modulated acquisition sequence to the digital complex multiplier 352. The digital complex multiplier 352 is configured to perform a complex multiplication in the digital domain. This complex multiplication includes multiplying a modulated acquisition sequence from the CEADG 350 by a digital representation of a chaotic sequence to yield a reference for a digital input signal. The digital complex multiplier 352 is also configured to communicate reference signal to the multiplexers 346, 348. The multiplexer 346 is configured to route the quadrature-phase part of a reference signal to the correlator 328. The multiplexer 348 is configured to route the in-phase part of a reference signal to the correlator 328. In this regard, it should be appreciated that the multiplexers 346, 348 are coupled to the receiver controller 338. The receiver controller 338 is configured to control the multiplexers 346, 348 in tandem so that the multiplexers 346, 348 route the reference signal to the correlator 328 while the receiver 104 is in an acquisition mode (described below).

The correlator 328 is configured to correlate a chaotic sequence with a digital input signal. In this regard, it should be understood that, the sense of the real and imaginary components of the correlation is directly related to the values of the real and imaginary components of the symbols of a digital input signal. It should also be understood that, in a preferred embodiment, the sense of the real and imaginary components of the correlation is directly related to the values of the real and imaginary components of the PSK symbols of a digital input signal. Thus, when the correlator 328 is in a steady state demodulation mode the output of the correlator 328 is PSK symbol soft decisions. In this regard, it should be appreciated that soft information refers to soft-values (which are represented by soft-decision bits) that comprise information about the bits contained in a sequence. In particular, soft-values are values that represent the probability that a particular bit in a sequence is either a one (1) or a zero (0). For example, a soft-value for a particular bit can indicate that a probability of a bit being a one (1) is $p(1)=0.3$. Conversely, the same bit can have a probability of being a zero (0) which is $p(0)=0.7$.

The correlator 328 is also configured to communicate PSK soft decisions to the hard decision device 330 for final symbol decision making. The hard decision device 330 is configured to communicate symbol decisions to the S/B converter 332. The S/B converter 332 is configured to convert symbols to a binary form. The S/B converter 332 is configured to communicate a binary data sequence to the source decoder 334. The source decoder 334 is configured to decode FEC applied at the transmitter and to pass the decoded bit stream to one or more external devices (not shown) utilizing the decoded data.

The correlator 328 is also configured to acquire initial timing information associated with a chaotic sequence, initial timing associated with a data sequence and to track phase and frequency offset information between the chaotic sequence and a digital input signal. The correlator 328 is also configured to track input signal magnitude information between the chaotic sequence and a digital input signal. Acquisition of initial timing information and tracking of input signal magnitude, phase and frequency offset information are both standard functions in digital communication systems. As such, methods for acquiring initial timing information and tracking phase and frequency offset information are well known to persons skilled in the art, and therefore will not be described in detail herein. However, it should be appreciated that any such method can be used without limitation.

Referring again to FIG. 3A, the correlator 328 is configured to communicate the magnitude and phase information as a function of time to the loop control circuit 320. The loop control circuit 320 uses the magnitude and phase information to calculate the deviation of the input signal magnitude from a nominal range, and phase and frequency offset information to synchronize a chaotic sequence with a digital input signal. The loop control circuit 320 is also configured to communicate the phase and frequency offset information to the quadrature digital local oscillator 322 portion of the IF translator and gain deviation compensation information to the automatic gain control (AGC) amplifier 308. The loop control circuit 320 is further configured to communicate a retiming control signal to the re-sampling filter SRMD 344 and the chaos generator 340.

It should be understood that the digital generation of the digital chaotic sequence at the transmitter 102 and receiver 104 is kept closely coordinated under the control of a precision real time reference clock 336. The higher the precision of the clock 336, the closer the synchronization of the chaos generator 218 of the transmitter 102 and the chaos generator 340 of the receiver 104 shall be excluding the effects of processing delay differences and channel propagation times. It is the use of digital chaos generators 218, 340 that allow the states of the chaos generators to be easily controlled with precision, thus allowing coherent communication.

Referring again to FIG. 3A, the precision real time reference clock 336 is a stable local oscillator locked to a precision real time reference, such as a GPS clock receiver or a chip scale atomic clock (CSAC). The precision real time reference clock 336 is configured to supply a high frequency clock to the clocked logic circuits 314, . . . , 352 while being locked to a lower frequency reference clock. The lower frequency reference clock supplies a common reference and a common real time of day reference to prevent a large drift between the states of the chaos generator 218 and the chaos generator 340 of the receiver 104 over an extended time interval.

The operation of the receiver 104 will now be briefly described with regard to an acquisition mode and a steady state demodulation mode.

Acquisition Mode:

In acquisition mode, the re-sampling filter 344 performs a rational rate change and forwards a transformed chaotic sequence to the digital complex multiplier 352. The CEADG 350 generates a modulated acquisition sequence and forwards the same to the digital complex multiplier 352. The digital complex multiplier 352 performs a complex multiplication in the digital domain. In the digital complex multiplier 352, a modulated acquisition sequence from the CEADG 350 is multiplied by a digital representation of a chaotic sequence to yield a reference for a digital input signal that was generated at the transmitter 102 to facilitate initial acquisition. The chaotic sequence is generated in the chaos generator 340. The digital complex multiplier 352 communicates a reference signal to the multiplexers 346, 348. The multiplexers 346, 348 route the reference signal to the correlator 328. The correlator 328 is transitioned into a search mode. In this search mode, the correlator 328 searches across an uncertainty window to locate a received signal state so that the chaos generator 340 can be set with the time synchronized state vector.

Steady State Demodulation Mode:

In steady state demodulation mode, the correlator 328 tracks the correlation between the received modulated signal and the locally generated chaos close to the nominal correlation peak to generate magnitude and phase information as a function of time. This information is passed to the loop control circuit 320. The loop control circuit 320 applies appropriate algorithmic processing to this information to extract phase offset, frequency offset, and magnitude compensation information. The correlator 328 also passes its output information, based on correlation times terminated by symbol boundaries, to the hard decision block 330. The hard decision block 330 compares the correlation information to pre-determined thresholds to make hard symbol decisions. The loop control circuit 320 monitors the output of the correlator 318. When the loop control circuit 320 detects fixed correlation phase offsets, the phase control of the quadrature digital local oscillator 322 is modified to remove the phase offset. When the loop control circuit 320 detects phase offsets that change as a function of time, it adjusts the re-sampling filter 344 which acts as an incommensurate re-sampler when the receiver 104 is in steady state demodulation mode or the frequency control of the quadrature digital local oscillator 322 is modified to remove frequency or timing offsets. When the correlator's 328 output indicates that the received digital input signal timing has "drifted" more than plus or minus a half ($\frac{1}{2}$) of a sample time relative to a locally generated chaotic sequence. The loop control circuit 320: (1) adjusts a correlation window in an appropriate temporal direction by one sample time; (2) advances or retards a state of the local chaos generator 340 by one iteration state; and (3) adjusts the re-sampling filter 344 to compensate for the time discontinuity. This loop control circuit 320 process keeps the chaos generator 218 of the transmitter 102 and the chaos generator 340 of the receiver 104 synchronized to within half ($\frac{1}{2}$) of a sample time.

If a more precise temporal synchronization is required to enhance performance, a resampling filter can be implemented as a member of the class of polyphase fractional time delay filters. This class of filters is well known to persons skilled in the art, and therefore will not be described in great detail herein.

As described above, a number of chaotic samples are combined with an information symbol at the transmitter 102. Since the transmitter 102 and receiver 104 timing are referenced to two (2) different precision real time reference clock 212, 336 oscillators, symbol timing must be recovered at the receiver 104 to facilitate robust demodulation. Symbol timing recovery can include: (1) multiplying a received input signal by a complex conjugate of a locally generated chaotic sequence using the complex multiplier 324; (2) computing an N point running average of the product where N is a number of chaotic samples per symbol time; (3) storing the values, the maximum absolute values of the running averages, and the time of occurrence; and (4) statistically combining the values at the symbol timing recovery circuit 326 to recover symbol timing. It should be noted that symbol timing recover can also be accomplished via an output of the correlator 328. However, additional correlator operations are needed in such a scenario. As should be appreciated, using a separate multiplier operation for this purpose adds additional capabilities to the receiver 104, such as the capability to correlate and post process over multiple correlation windows simultaneously to locate the best statistical fit for symbol timing.

In this steady state demodulation mode, the symbol timing recovery circuit 326 communicates a symbol onset timing to the correlator 328 for controlling an initiation of a symbol correlation. The correlator 328 correlates a locally generated chaotic sequence with a received digital input signal during a symbol duration. In this regard, it should be understood that, the sense and magnitude of a real and imaginary components of the correlation is directly related to the values of the real and imaginary components of symbols of a digital input signal. Accordingly, the correlator 328 generates symbol soft decisions. The correlator 328 communicates the symbol soft decisions to the hard decision device 330 for final symbol decision making. The hard decision device 330 determines symbols using the symbol soft decisions. Thereafter, the hard decision device 330 communicates the symbols to the S/B converter 332. The S/B converter 332 converts the symbol decisions to a binary form. The S/B converter 332 is configured to communicate a binary data sequence to the source decoder 334. The source decoder 334 is configured to decide FEC applied at the transmitter 102 and pass the decoded bit stream to one or more external devices (not shown) utilizing the decoded data.

A person skilled in the art will appreciate that the receiver 104 is one architecture of a communications system receiver. However, the invention is not limited in this regard and any other receiver architecture can be used without limitation. For example, another embodiment of a receiver is provided in FIG. 3B.

Referring now to FIG. 3B, there is provided a block diagram of another embodiment of a receiver that is useful for understanding the invention. As shown in FIG. 3B, the receiver 390 is comprised of an antenna element 392, a low noise amplifier (LNA) 354, a zonal filter 356, intermediate frequency (IF) translators 358, 364, an anti-alias filter 360, and an analog-to-digital (A/D) converter 362. The receiver 390 is also comprised of a loop control circuit 366, a correlator 368, and a digital complex multiplier 370. The receiver 390 is further comprised of a receiver controller 374, a precision real time reference 376, a hard decision device 372, a symbol to bits (S/B) converter 384, and a source decoder 386. The receiver 390 is comprised of a residue number system (RNS) chaos generator 382 and a real uniform statistics to quadrature Gaussian statistics mapper 378. Each of the above listed components 354-386, 392 are similar to the respective components 302-306, 312, 314, 320, 328-342, 352 of FIG. 3A. Thus, the description provided above in relation to FIG. 3A is sufficient for understanding the receiver 390 architecture shown in FIG. 3B.

Chaos Generators and Digital Chaotic Sequence Generation

Figure 4:
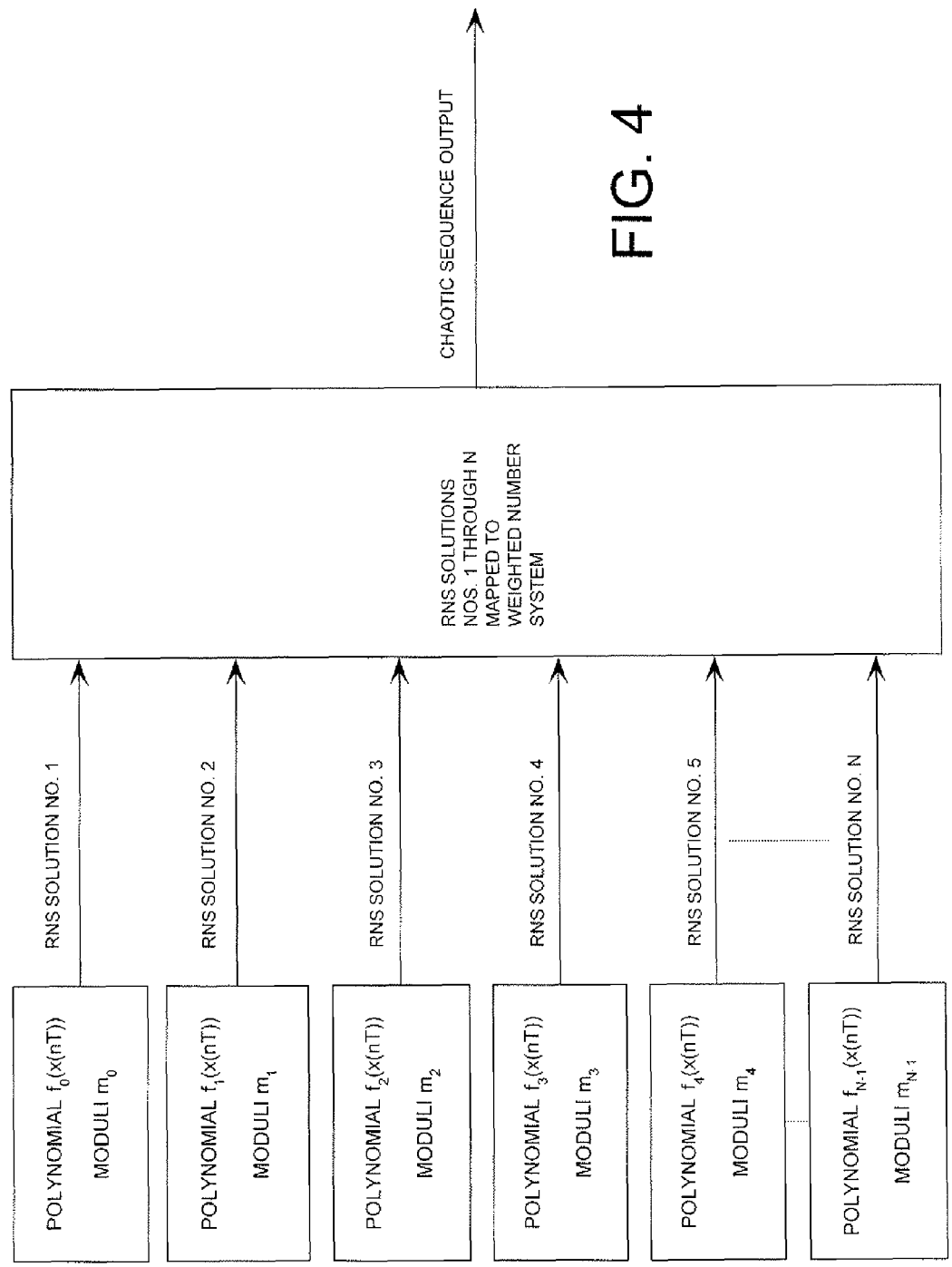
FIG. 4 is a conceptual diagram of the digital chaos generators of FIGS. 2-3 that is useful for understanding the invention.

Referring now to FIG. 4, there is provided a conceptual diagram of a chaos generator 218, 340, 382 (described above in relation to FIGS. 2-3B) that is useful for understanding the invention. As shown in FIG. 4, generation of the chaotic sequence begins with N polynomial equations $f_0(x(nT)), \ldots, f_{N-1}(x(nT))$. The N polynomial equations $f_0(x(nT)), \ldots, f_{N-1}(x(nT))$ can be selected as the same polynomial equation or as different polynomial equations. According to an aspect of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field (f). For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT)) \cdot h(x(nT))$.

As will be understood by a person skilled in the art, each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to persons skilled in the art. Thus, such operations will not be described in great detail herein. However, it should be appreciated that a RNS residue representation for some weighted value "a" can be defined by mathematical Equation (1).

$$R=\{a \text{ modulo } m_0, a \text{ modulo } m_1, \ldots, a \text{ modulo } m_{N-1}\} \quad (1)$$

where R is a RNS residue N-tuple value representing a weighted value "a". Further, R(nT) can be a representation of the RNS solution of a polynomial equation $f(x(nT))$ defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as a RNS residue value uses a different prime number $p_0, p_1, \ldots, p_{N-1}$ as a moduli $m_0, m_1, \ldots, m_{N-1}$.

Those skilled in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (2).

$$f(x(nT))=Q(k)x^3(nT)+R(k)x^2(nT)+S(k)x(nT)+C(k,L) \quad (2)$$

where n is a sample time index value. k is a polynomial time index value. L is a constant component time index value. T is a fixed constant having a value representing a time interval or increment. Q, R, and S are coefficients that define the polynomial equation $f(x(nT))$. C is a coefficient of $x(nT)$ raised to a zero power and is therefore a constant for each polynomial characteristic. In a preferred embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)) \ldots, f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 4 will depend on the quantity of polynomial equations N and the modulus values $m_0, m_1, \ldots, m_{N-1}$ values selected for the RNS number systems. In particular, this value can be calculated as the product $M=m_0 \cdot m_1 \cdot m_3 \cdot m_4 \cdot \ldots \cdot m_{N-1}$.

Referring again to FIG. 4, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical Equation (3).

$$BL=\text{Ceiling}[\text{Log } 2(m)] \quad (3)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M-1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of every M times T seconds, i.e, a sequence repetition times an interval of time between exact replication of a sequence of generated values. Still, the invention is not limited in this regard.

Referring again to FIG. 4, the RNS solutions Nos. 1 through N are mapped to a weighted number system representation thereby forming a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1."$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x - a_1$ in its residue code. The quantity $x - a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_i}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1}, a_2 = \left\langle \left\lfloor \frac{x}{m_1} \right\rfloor \right\rangle_{m_2}, a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i}."$$

See Id. From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions Nos. 1 through N to a weighted number system representation. The CRT arithmetic operation is well known in the art and therefore will not be described here in detail. The first known formulation of the Chinese Remainder Theorem is attributed to Sunzi in his "Book of Arithmetics" circa 500 A.D. However, a brief discussion of how the CRT is applied may be helpful for understanding the invention. The CRT arithmetic operation can be defined by a mathematical Equation (4) [returning to zero (0) based indexing].

$$Y = \left\{ \begin{array}{l} \left\langle \langle [3x_0^3((n-1)T) + 3x_0^2((n-1)T) + x_0((n-1)T) + C_0(nT)]b_0 \rangle_{p_0} \dfrac{M}{p_0} \right\rangle_M + \ldots + \\ \left\langle \langle [3x_{N-1}^3((n-1)T) + 3x_{N-1}^2((n-1)T) + x_{N-1}((n-1)T) + C_{N-1}(nT)]b_{N-1} \rangle_{p_{N-1}} \dfrac{M}{p_{N-1}} \right\rangle_M \end{array} \right\}_M \quad (4)$$

Mathematical Equation (4) can be re-written as mathematical Equation (5).

$$Y = \left\{ \begin{array}{l} \left\langle \langle [3x_0^3((n-1)T) + 3x_0^2((n-1)T) + x_0((n-1)T) + C_0(nT)]b_0 \rangle_{p_0} \dfrac{M}{p_0} \right\rangle_M + \ldots + \\ \left\langle \langle [3x_{N-1}^3((n-1)T) + 3x_{N-1}^2((n-1)T) + x_{N-1}((n-1)T) + C_{N-1}(nT)]b_{N-1} \rangle_{p_{N-1}} \dfrac{M}{p_{N-1}} \right\rangle_M \end{array} \right\}_M \quad (5)$$

where Y is the result of the CRT arithmetic operation. n is a sample time index value. T is a fixed constant having a value representing a time interval or increment. $x_0$-$x_{N-1}$ are RNS solutions Nos. 1 through N. $p_0, p_1, \ldots, p_{N-1}$ are prime numbers. M is a fixed constant defined by a product of the relatively prime numbers $p_0, p_1, \ldots, p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left(\frac{M}{p_j}\right)^{-1} \bmod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M-1. Thus for certain embodiments of the present invention, the $b_j$'s can be defined as $$b_j = \left(\frac{M}{p_j}\right)^{-1} \bmod p_j.$$

In other embodiments of the present invention, all $b_j$'s can be set equal to one or more non-zero values without loss of the chaotic properties.

As should be appreciated, the chaotic sequence output Y can be expressed in a binary number system representation. As such, the chaotic sequence output Y can be represented as a binary sequence. Each bit of the binary sequence has a zero (0) value or a one (1) value. The chaotic sequence output Y can have a maximum bit length (MBL) defined by a mathematical Equation (6).

$$MBL = \text{Ceiling}[\text{Log } 2(M)] \quad (6)$$

where M is the product of the relatively prime numbers $p_0, p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059, 523). By substituting the value of M into Equation (6), the bit length (BL) for a chaotic sequence output Y expressed in a binary system representation can be calculated as follows: BL=Ceiling[Log 2(3,563,762,191,059,523)=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059, 522), inclusive. Still, the invention is not limited in this regard. For example, chaotic sequence output Y can be a binary sequence representing a truncated portion of a value between zero (0) and M-1. In such a scenario, the chaotic sequence output Y can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (2) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1 \text{ ms}))=3x^3((n-1)\cdot 1 \text{ ms})+3x^2((n-1)\cdot 1 \text{ ms})+x((n-1)\cdot 1 \text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 5:
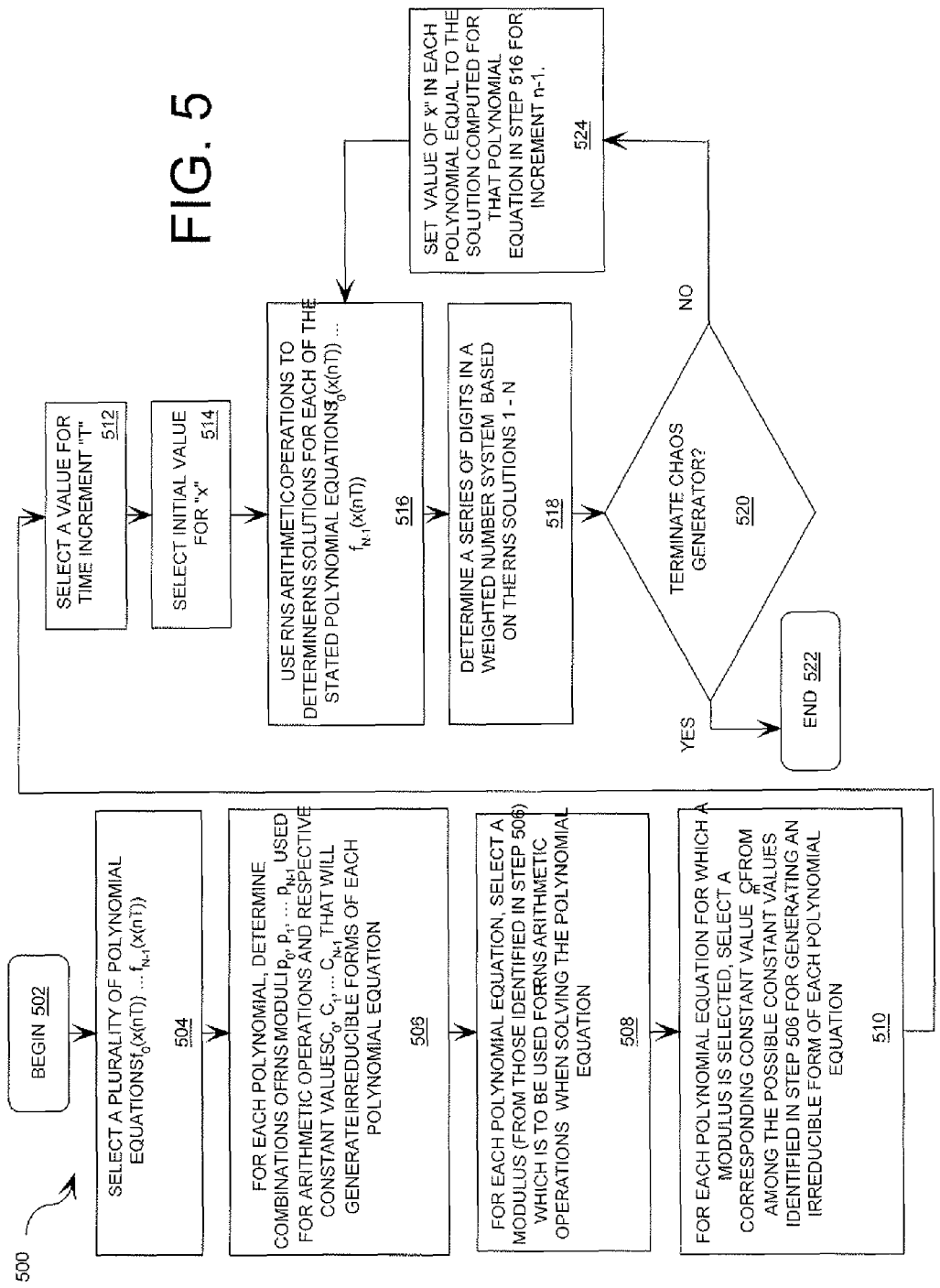
FIG. 5 is a flow diagram of a method for generating a discrete chaotic sequence that is useful for understanding the invention.

Referring now to FIG. 5, there is provided a flow diagram of a method 500 for generating a chaotic sequence that is useful for understanding the invention. As shown in FIG. 5, the method 500 begins with step 502 and continues with step 504. In step 504, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 504, step 506 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 508, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 506. It should also be appreciated that a different modulus must be selected for each polynomial equation $f_0(x(nT)), \ldots, f_{N-1}(x(nT))$.

As shown in FIG. 5, the method 500 continues with a step 510. In step 510, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 506 for generating an irreducible form of the respective polynomial equation $f_0(x(nT)), \ldots, f_{N-1}(x(nT))$.

After step 510, the method 500 continues with step 512. In step 512, a value for time increment "T" is selected. Thereafter, an initial value for "x" is selected. In this regard, it should be appreciated that the initial value for "x" can be any value allowable in a residue ring. Subsequently, step 516 is performed where RNS arithmetic operations are used to iteratively determine RNS solutions for each of the stated polynomial equations $f_0(x(nT)), \ldots, f_{N-1}(x(nT))$. In step 518, a series of digits in a weighted number system are determined based in the RNS solutions. This step can involve performing a mixed radix arithmetic operation or a CRT arithmetic operation using the RNS solutions to obtain a chaotic sequence output.

After step 518, the method 500 continues with a decision step 520. If a chaos generator is not terminated (520:NO), then step 524 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 516. Subsequently, the method 500 returns to step 516. If the chaos generator is terminated (520:YES), then step 522 is performed where the method 500 ends.

A person skilled in the art will appreciate that the method 500 is one architecture of a method for generating a chaotic sequence. However, the invention is not limited in this regard and any other method for generating a chaotic sequence can be used without limitation.

Figure 6:
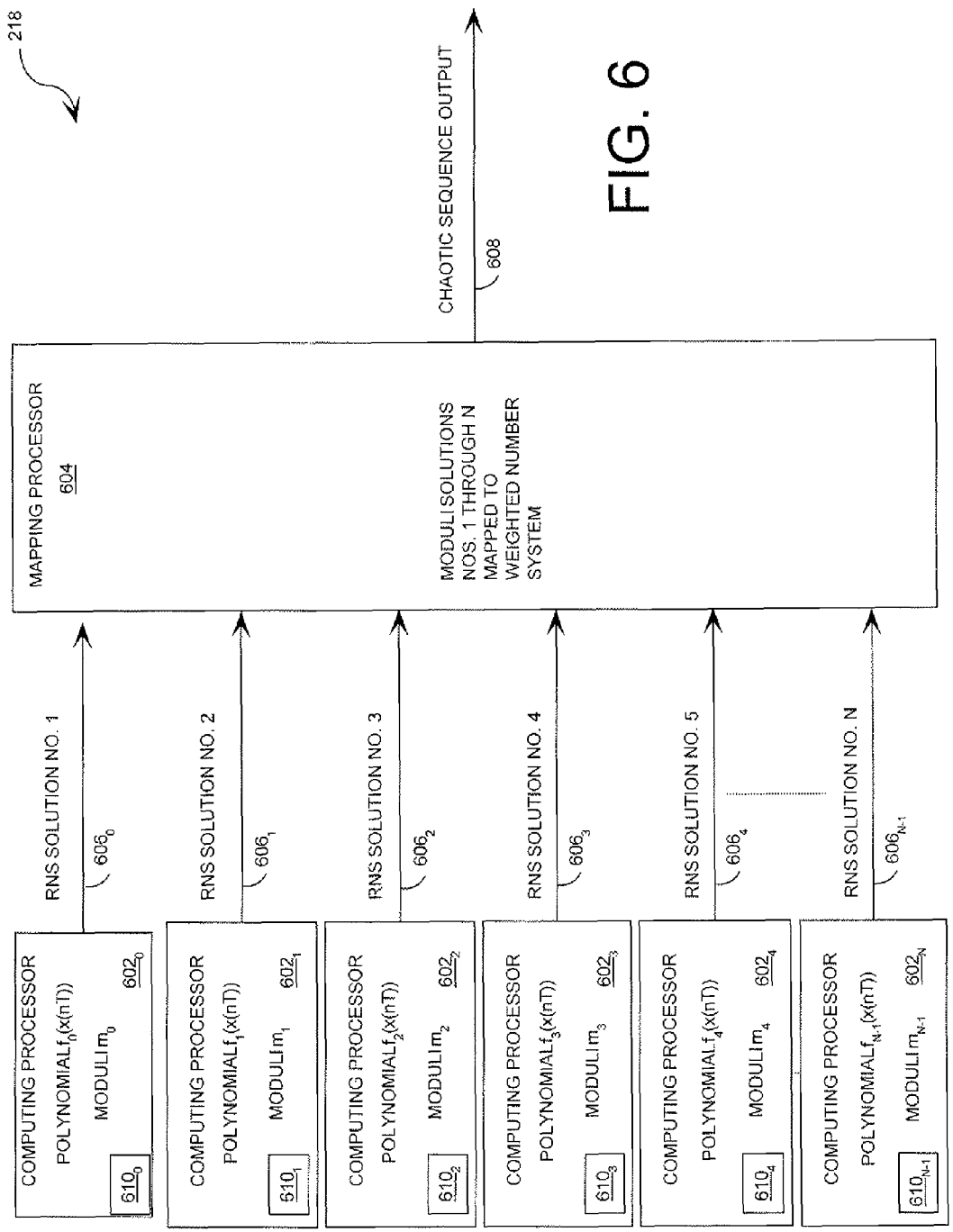
FIG. 6 is a block diagram of the chaos generator of FIG. 2 that is useful for understanding the invention.

Referring now to FIG. 6, there is illustrated one embodiment of a chaos generator 218. The chaos generator 218 is comprised of hardware and/or software configured to generate a digital chaotic sequence. In this regard, it should be appreciated that the chaos generator 218 is comprised of computing processors $602_0$-$602_{N-1}$. The chaos generator 218 is also comprised of a mapping processor 604. Each computing processor $602_0$-$602_{N-1}$ is coupled to the mapping processor 604 by a respective data bus $606_0$-$606_{N-1}$. As such, each computing processor $602_0$-$602_{N-1}$ is configured to communicate data to the mapping processor 604 via a respective data bus $606_0$-$606_{N-1}$. The mapping processor 604 can be coupled to an external device (not shown) via a data bus 608. In this regard, it should be appreciated that the external device (not shown) includes, but is not limited to, a communications device configured to combine or modify a signal in accordance with a chaotic sequence output.

Referring again to FIG. 6, the computing processors $602_0$-$602_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $602_0$-$602_{N-1}$ employ modulo operations to calculate a respective solution for each polynomial equation $f_0(x(nT)), \ldots, f_{N-1}(x(nT))$ using modulo based arithmetic operations. Each of the computing processors $602_0$-$602_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $602_0$-$602_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $602_0$-$602_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $610_0$-$610_{N-1}$ are chaotic. In this regard, it should be appreciated that the feedback mechanisms $610_0$-$610_{N-1}$ are provided so that the solutions for each polynomial equation $f_0(x(nT)), \ldots, f_{N-1}(x(nT))$ can be iteratively computed. Accordingly, the feedback mechanisms $610_0$-$610_{N-1}$ are comprised of hardware and/or software configured to selectively define a variable "x" of a polynomial equation as a solution computed in a previous iteration.

Referring again to FIG. 6, the computing processors $602_0$-$602_{N-1}$ are further comprised of hardware and/or software configured to express each of the RNS residue values in a binary number system representation. In this regard, the computing processors $602_0$-$602_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $602_0$-$602_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. On each iteration, the table address is used to initiate the sequence. Still, the invention is not limited in this regard.

Referring again to FIG. 6, the mapping processor 604 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 604 can be comprised of hardware and/or software configured to determine the series of digits in the weighted number system based on the RNS residue values using a Chinese Remainder Theorem process. In this regard, it will be appreciated by those skilled in the art that the mapping processor 604 is comprised of hardware and/or software configured to identify a number in the weighted number system that is defined by the moduli solutions Nos. 1 through N.

According to an aspect of the invention, the mapping processor 604 can be comprised of hardware and/or software configured to identify a truncated portion of a number in the weighted number system that is defined by the moduli solutions Nos. 1 through N. For example, the mapping processor 604 can also be comprised of hardware and/or software configured to select the truncated portion to include any serially arranged set of digits of the number in the weighted number system. Further, the mapping processor 604 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 6, the mapping processor 604 is comprised of hardware and/or software configured to express a chaotic sequence in a binary number system representation. In this regard, it should be appreciated that the mapping processor 604 can employ a weighted-to-binary conversion method. Such methods are generally known to persons skilled in the art and therefore will not be described in great detail herein. However, it should be appreciated that any such method can be used without limitation.

A person skilled in the art will appreciate that the digital chaos generator described in relation to FIGS. 1-6 is provided by way of example and is not intended to limit the invention. In this regard, the digital chaos generator described herein is merely one architecture that can be used to implement a digital chaos generator in the various inventive arrangements. Any other digital chaos generator architecture can be used without limitation Likewise, any other suitable method of generating digital chaos now known, or known in the future can be used to implement the methods of the present invention.

Neighbor Discovery using Chaotic Sequence Spread Waveform

Figure 7:
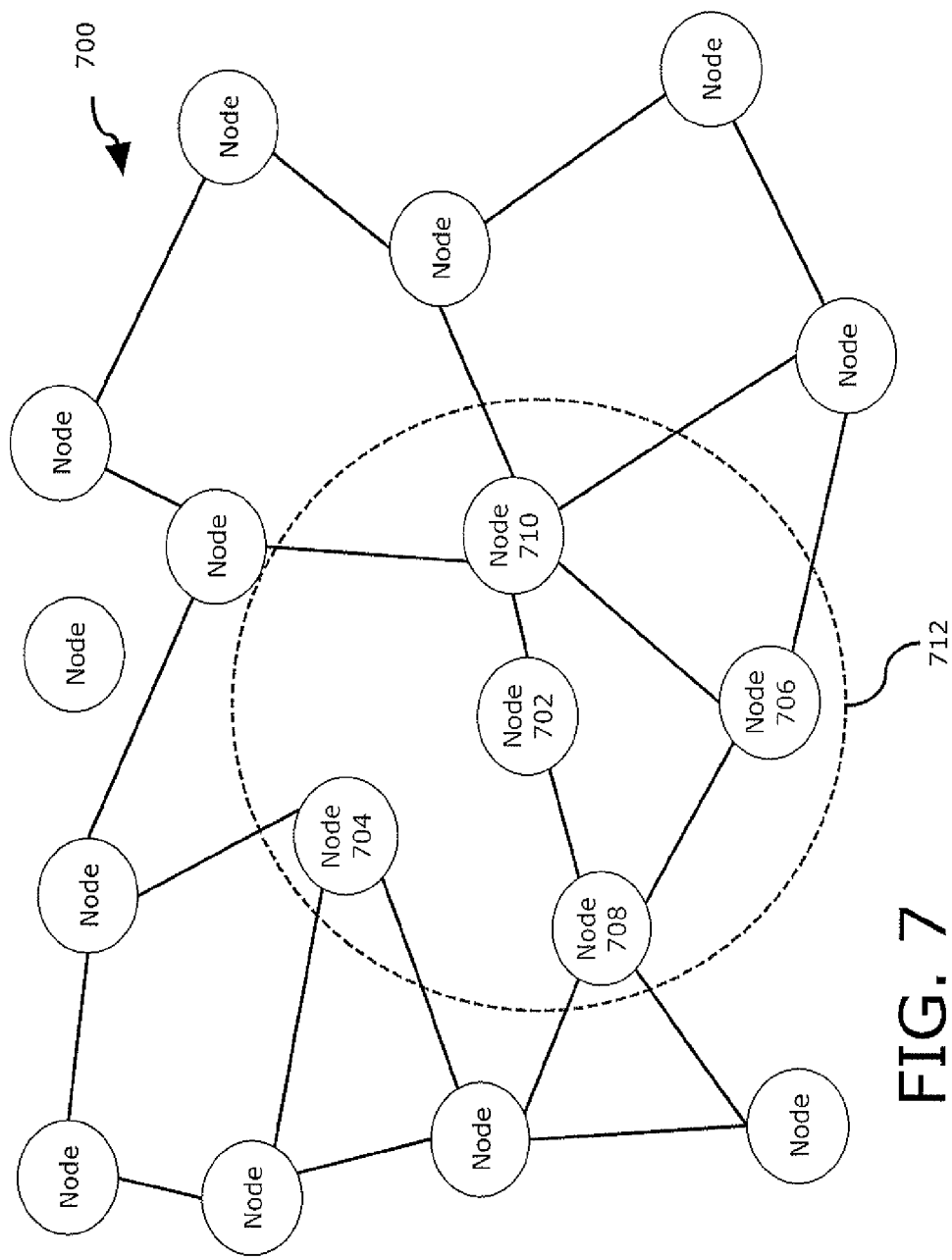
FIG. 7 is drawing that is useful for understanding the concept of neighbor discovery in an ad-hoc wireless network.

FIG. 7 is a diagram of a wireless ad-hoc network 700 that is useful for understanding the invention. Each circle in the diagram represents a node which can communicate with other nodes in the ad-hoc network. The lines drawn between nodes represent communication links that are already established in the ad-hoc network between various neighbor nodes. In this regard, it should be understood that these communication links generally represent bidirectional wireless communications links through which network data can be communicated from node to node. These links can be implemented using any communication protocol, including but not limited to physical layer transmission using spread spectrum waveforms.

Each node in the network has the ability to communicate with other nodes in the network over some predetermined distance, which can depend upon a variety of factors, including transmitter power, processing gain, frequency re-use, antenna directivity, and environmental conditions. An exemplary communication range 712 is shown for node 702. Thus, node 702 is potentially able to communicate with nodes 704, 706, 708, and 710. Those skilled in the art will appreciate that the communication range 712 is an idealized representation of an omni-directional pattern. However, it should be understood that the invention is not limited in this regard.

In FIG. 7, it can be observed that node 702 has already established communication links with nodes 708, 710, but not nodes 704, 706. However, node 702 also has the ability to establish a communication link with node 704, 706. Such a communication link can be established by node 702 transmitting a beacon signal to all nodes within communication range 712. Such beacon signal can alert the neighboring nodes (including node 704 and 706) that node 702 is present and available for establishing a communication link.

The beacon signal advantageously includes beacon data. Beacon data includes various types of data useful for identifying neighbor nodes and establishing communication links between such neighbor nodes in the ad-hoc network. For example, it is known in the art that a beacon signal can specify data network initialization parameters and/or network characteristics. Such information advantageously includes routing tables, transmission rates in the network, transmission frequency, transmission time slots, transmission pattern, quality of service (QoS), acceptable bit error rates and/or available bandwidth. In the case of a mobile ad-hoc network (MANET) the beacon can contain additional information concerning movements of a group of nodes, node velocity, node acceleration and so on. Such information can be determined using global positioning satellites (GPS) or other means. The foregoing list of beacon information is provided by way of example, and is not intended to limit the scope of the invention.

Figure 8:
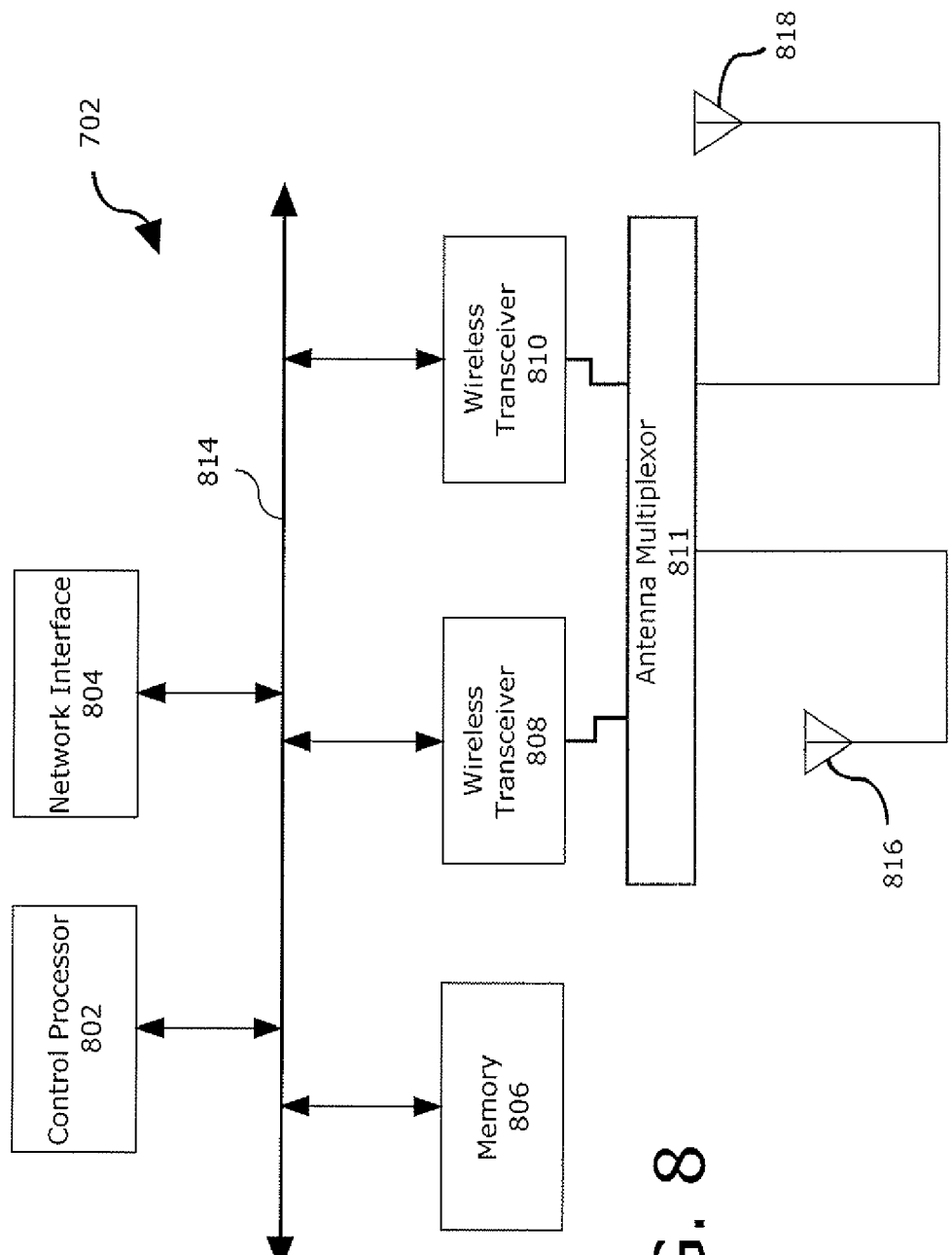
FIG. 8 is a block diagram of an exemplary node of an ad-hoc network that is useful for understanding the invention.

FIG. 8 is a block diagram of an exemplary node 702 that is useful for understanding the invention. Each of the other nodes in ad-hoc network 700 are advantageously selected to have a similar architecture or at least similar functional capabilities. The node 702 includes a control processor 802, network interface 804, memory 806, wireless transceiver 808, wireless transceiver 810, antenna multiplexor 811, and data bus 814. The node can also include up to two or more antennas 816, 818.

The node 702 shown in FIG. 8 is one illustrative embodiment of the invention. This invention, may however, be embodied in many different forms and should not be construed as limited to the embodiments set forth herein. Dedicated hardware implementations including, but not limited to, application-specific integrated circuits, programmable logic arrays, and other hardware devices can be constructed to implement the node 702 as described herein. Applications that can include the apparatus and systems of various embodiments broadly include a variety of electronic and computer systems controlled by software or firmware. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

Referring again to FIG. 8, the control processor 802 can be any data processing device suitable for controlling the operation of the node 702 as shall hereinafter be described in further detail. For example, the control processor 802 can be implemented as a microprocessor or central processing unit (CPU) programmed with a set of instructions. The memory 806 can be any suitable type of data storage device. For example the memory 806 can include a conventional random access memory (RAM), a read-only memory (ROM) device for storing data or instructions for the control processor 802, and/or any other type of computer-readable medium. Data can be communicated between control processor 802 and memory 806 via a data bus 814.

The node 702 advantageously includes a network interface 804. The network interface 804 can be any combination of hardware and/or software that implements network communications in accordance with a particular network standard and protocol. Thus, the network interface 804 can include without limitation a serial line interface, an Ethernet interface, an asynchronous transfer mode (ATM) network interface, and/or an interface to a local area network (LAN). In this regard, it will be appreciated that the disclosure is not limited to any particular network standards or protocols. Such standards are periodically superseded by faster or more efficient equivalents having essentially the same functions. Accordingly, replacement standards and protocols having the same functions are considered equivalents.

The node 702 also includes one or more wireless transceivers 808, 810. The one or more wireless transceivers 808, 810 communicate with other nodes in the ad-hoc network through one or more antennas 816, 818. An antenna multiplexor 811 is advantageously provided for communicating signals to and from a selected antenna from a particular one of the wireless transceivers. Multiple antennas or antenna elements can be useful for a variety of purposes in node 702. For example, one antenna 816 can be a directional type antenna, whereas a second antenna 818 can be an omni-directional type antenna. The directional type antenna can be more suited for communications with specific nodes, whereas the omni-directional antenna is sometimes desirable for use with beacon signal transmissions. Alternately, the second or additional antennas may be used to simultaneously communicate on different frequency bands. Still, the invention is not limited in this regard, and one or both antenna types can be used for beacon signal transmissions.

According to an embodiment of the invention, at least one of the wireless transceivers used for beacon signal transmissions includes a transmitter 102 and receiver 104 which function as previously described in relation to FIGS. 1-6. Thus, at least one wireless transceiver 808, 810 provided in each node implements a coherent chaotic spread-spectrum communication system for transmission and receiving of beacon signals. Thus at least one transceiver 808, 810 in each node is configured to transmit analog chaotic signals to other nodes via a wireless communications link. Transceivers at receiving nodes are configured to down convert, digitize, and de-spread the transmitted analog chaotic signal by correlating it with a replica of the chaotic sequence generated at the transmitter. The chaotic sequence in each node is time synchronized to the chaotic sequence in the other nodes.

The distinction between conventional direct sequence spread spectrum systems and chaotic spread spectrum communication is subtle, but important. Conventional direct sequence spread spectrum systems use a discrete-time string of binary pseudorandom number (PN) code symbols called "chips" to phase modulate a carrier signal. The chips are generally of a much shorter duration as compared to each information bit of payload data to be transmitted. Since the rate of the PN code symbols is much higher than the rate of the information bits, each information bit is effectively modulated by the continuous string of PN code symbols. The sequence of the PN code symbols is known a priori by both the transmitter and receiver nodes. Accordingly, when the spread spectrum signal is received by the receiver, it can be demodulated using the same PN code, usually with at least some processing gain. Significantly, however, in direct sequence spread spectrum systems the chips are comprised of a pseudorandom sequence of 1 and −1 values. In other words, the amplitude of the chips does not generally vary from these two values. Quadrature implementations of direct sequence spread spectrum modulation schemes also maintain a balanced phase between successive chips. Both implementations have the undesired effect of generating characteristic features embedded within the signal that can be used by an adversary for unintended detection and signal tracking.

From the foregoing, it will be appreciated that the conventional approach to direct sequence spread spectrum creates problems for beacon signal transmissions, where it is desirable to maintain a low probability of detection and intercept. The PN sequence used in such systems is not truly random, but merely pseudo-random. This means that the resulting spread spectrum signal will inevitably include cyclo-stationary properties that can be detected and exploited by adversaries. In order to minimize the likelihood that such cyclo-stationary features can be exploited, conventional direct sequence spread spectrum communications must utilize very low power levels when this conventional approach is used for beacon signals. This means that such systems require very high processing gain, which is achieved by making the rate of the chipping sequence much higher than the data rate. However, such very high spread ratios inevitably lead to very low data rates.

In contrast to the conventional direct sequence spread spectrum approach, the present invention utilizes a chaotic sequence generator which generates a different type of chipping sequence. The chipping sequence is based on digital chaos generated by means such as that which has been previously described in relation to FIGS. 4-6. Notably, a truly chaotic chipping sequence, such as would be generated by the system described in FIGS. 4-6 is absent of cyclo-stationary features, and offers low probability of detection and interception. Further, rather than merely relying upon a series of chips that are 1 or −1 in value, the sequence of chips used in the chaotic spreading sequence have values that vary chaotically and can be essentially any magnitude. Consequently, the chaotic chipping sequence has a characteristic that is indistinguishable from white noise. In this regard, it should be understood that spread spectrum beacon signals generated using a chaotic spreading sequence as described appear to adversaries (any receiver without knowledge of the spreading sequence) as nothing more than band-limited noise. The relative power level of the beacon signals can therefore be increased without the same risk of exploitation as compared to conventional direct sequence spread spectrum systems. This permits a relatively high data rate to be accommodated on the spread spectrum beacon signal, thereby facilitating transmission of substantial amounts of beacon data as part of the beacon message. As a result, the detected node may establish normal data network communications quickly, and thereby transition more rapidly to a higher data rate communications link. Summarizing, the use of a digitally generated chaotic spreading sequence as described herein provides nodes with the ability to send larger amounts of data as compared to a beacon signal transmission that merely notifies neighbors that a node is present. This ability to send larger amounts of data provides (1) faster initiation of high-rate data communications, and (2) permits the use of fewer beacon signal bursts to lower detection probability.

The present invention can be used for neighbor discovery in any ad-hoc wireless communication system where low probability of intercept/detection is a desirable feature. A wide variety of neighbor discovery methods are known in the art an the inventive arrangements described herein can be used to implement neighbor discovery transmissions in all such systems whether now known or known in the future. For example, when a network has a large number of nodes, it is known in the art that the most effective neighbor discovery routine is a periphery-based approach where designated nodes on the periphery of the network perform network acquisition processing for the entire network.

Beacon communications are well known in the wireless ad-hoc network field and the present invention can be used with all such wireless ad-hoc networks where beacon signals are used. Once a node receives a beacon signal, it can attempt to respond to the node from which the beacon signal was initially sent to establish a communication link with that node. Various types of authentication and handshake routines are known in the art for permitting a node to respond to a beacon signal. All such authentication and handshake routines whether now known, or known in the future, can be used with the present invention.

Finally, it should be noted that the use of chaotic spread spectrum communications need not be limited to use for transmission of the beacon signal. Instead, the chaotic spread spectrum communications methods and systems as described herein can also be used for various handshakes and communications generated in response to the beacon signal. It is further contemplated that following the beacon transmission, when a node is associated with another node for purposes of network communications, such network communications can be performed using the chaotic spread spectrum communication as described herein. However, the invention is not limited in this regard, and the network communications subsequent to the initial beacon or handshake can optionally be performed using other communications protocols that may offer still higher data rates.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for identifying neighbor nodes in an ad-hoc wireless network including a plurality of nodes, comprising:
generating a beacon signal at a first node of said network for alerting other nodes in said network of the presence of said first node, said beacon signal comprising beacon data and having a data rate, said beacon data including information specifying at least one of a data initialization parameter and a network characteristic that is useful for establishing a communication link between said first node and said other nodes of said network;
digitally generating a first chaotic spreading sequence at said first node;
modulating said beacon signal with said first chaotic spreading sequence to produce a spread spectrum beacon signal; and
transmitting said spread spectrum beacon signal at a first power level without risk of detection, wherein said first power level exceeds a second power level at which a beacon signal could be transmitted without risk of detection using a non-chaotic spreading code.

2. The method according to claim 1, further comprising transmitting said spread spectrum beacon signal from said first node in an omni-directional pattern.

3. The method according to claim 1, further comprising receiving said spread spectrum beacon signal with at least a second node in said network and coherently demodulating said spread spectrum beacon signal using a second chaotic spreading sequence digitally generated at said second node to obtain said beacon signal.

4. The method according to claim 3, further comprising:
identifying with said second node said first node as a neighbor node based on said beacon signal; and
transmitting a message from said second node to said first node in response to said beacon signal.

5. The method according to claim 4, further comprising transmitting said message from said second node to said first node using a directional antenna.

6. The method according to claim 4, further comprising transmitting network data between said first and said second node exclusive of using said first or second chaotic spreading sequence for modulating said network data following transmission of said beacon and said message.

7. The method according to claim 1, wherein said beacon signal is modulated to include beacon data, exclusive of said first chaotic spreading sequence, identifying one or more communication protocols associated with said ad-hoc network.

8. The method according to claim 7, wherein said beacon data includes one or more items selected from the comprising a data transmission rate, a transmission frequency, a receive frequency, a transmission time, a transmission protocol, a quality of service parameter, a bit error rate parameter, an available bandwidth, a position of a node, a node velocity, and a node acceleration.

9. The method according to claim 1, wherein said first node is selected to have a location near a periphery of said network.

10. The method according to claim 1, wherein said step of generating said digitally generated first chaotic spreading sequence further comprises:
selecting a plurality of polynomial equations;
using residue number system (RNS) arithmetic operations to respectively determine a plurality of solutions for said plurality of polynomial equations, said plurality of solutions iteratively computed and expressed as RNS residue values.

11. The method according to claim 10, wherein said step of generating said digitally generated first chaotic spreading sequence further comprises determining a series of digits in a weighted number system based on said plurality of RNS residue values.

12. An ad-hoc network including a plurality of nodes, comprising:
a first node including
a processor configured to generate a beacon signal for alerting other nodes in said network of the presence of said first node, said beacon signal comprising beacon data and having a data rate, said beacon data including information specifying at least one of a data initialization parameter and a network characteristic that is useful for establishing a communication link between said first node and said other nodes of said network;

a first spreading sequence generator configured to digitally generate a first chaotic spreading sequence;

a first modulator configured to modulate said beacon signal with said first chaotic spreading sequence to produce a spread spectrum beacon signal; and a first transmitter configured to transmit said spread spectrum beacon signal at a first power level without risk of detection, wherein said first power level exceeds a second power level at which a beacon signal could be transmitted without risk of detection using a non-chaotic spreading code.

13. The ad-hoc network according to claim 12, wherein said first node further comprises a omni-directional antenna and said spread spectrum beacon signal is broadcast from said omni-directional antenna.

14. The ad-hoc network according to claim 12, further comprising at least a second node including:

a receiver configured to receive said spread spectrum beacon signal;

a second spreading sequence generator configured to digitally generate a second chaotic spreading sequence; and a demodulator configured to demodulate said spread spectrum beacon signal using said second chaotic spreading sequence to obtain said beacon signal.

15. The ad-hoc network according to claim 14, wherein said second node further comprises:

a second processor configured to identify said first node as a neighbor node based on said beacon signal and generating a message in response to said beacon signal; and a second transmitter responsive to said second processor and configured to transmit said message to said first node.

16. The ad-hoc network according to claim 15, wherein said second node further comprises a directional antenna coupled to said second transmitter for transmitting said message from said second node to said first node.

17. The ad-hoc network according to claim 15, wherein following said transmission of said beacon signal and said message, said first and second transmitter are configured to transmit network data between said first and said second node exclusive of using said first or second chaotic spreading sequence.

18. The ad-hoc network according to claim 12, wherein said first node further comprises a beacon signal modulator configured to modulate said beacon signal to include data, exclusive of said first chaotic spreading sequence, and identifying one or more communication protocols associated with said ad-hoc network.

19. The ad-hoc network according to claim 18, wherein said beacon data includes one or more items selected from the comprising a data transmission rate, a transmission frequency, a receive frequency, a transmission time, a transmission protocol, a quality of service parameter, a bit error rate parameter, an available bandwidth, a position of a node, a node velocity, and a node acceleration.

20. The ad-hoc network according to claim 12, wherein said first node is located at or adjacent to a periphery of said network.

21. The ad-hoc network according to claim 12, wherein said first spreading sequence generator comprises a computing means configured to use residue number system (RNS) arithmetic operations to respectively determine a plurality of solutions for a plurality of polynomial equations, said plurality of solutions iteratively computed and expressed as RNS residue values.

22. The ad-hoc network according to claim 21, wherein said first spreading sequence generator further comprises a mapping means configured to determine a series of digits in a weighted number system based on said plurality of RNS residue values.

23. A network node for communicating in ad-hoc network including a plurality of nodes, comprising:

a processor configured to generate a beacon signal for alerting other nodes in said network of the presence of said network node, said beacon signal comprising beacon data and having a data rate, said beacon data including information specifying at least one of a data initialization parameter and a network characteristic that is useful for establishing a communication link between said first node and said other nodes of said network;

a first spreading sequence generator configured to digitally generate a first chaotic spreading sequence;

a first modulator configured to modulate said beacon signal with said first chaotic spreading sequence to produce a spread spectrum beacon signal; and a first transmitter configured to transmit said spread spectrum beacon signal at a first power level without risk of detection, wherein said first power level exceeds a second power level at which a beacon signal could be transmitted without risk of detection using a non-chaotic spreading code.

24. The network node according to claim 23, wherein said first node further comprises a beacon signal modulator configured to modulate said beacon signal to include data, exclusive of said first chaotic spreading sequence, and identifying one or more communication protocols associated with said ad-hoc network.

25. The network node according to claim 24, wherein said beacon data includes one or more items selected from the comprising a data transmission rate, a transmission frequency, a receive frequency, a transmission time, a transmission protocol, a quality of service parameter, a bit error rate parameter, an available bandwidth, a position of a node, a node velocity, and a node acceleration.

26. The ad-hoc network according to claim 23, wherein said spreading sequence generator comprises a computing means configured to use residue number system (RNS) arithmetic operations to respectively determine a plurality of solutions for a plurality of polynomial equations, said plurality of solutions iteratively computed and expressed as RNS residue values.

27. The ad-hoc network according to claim 26, wherein said spreading sequence generator further comprises a mapping means configured to determine a series of digits in a weighted number system based on said plurality of RNS residue values.

* * * * *